(12) United States Patent
Amano

(10) Patent No.: US 8,328,369 B2
(45) Date of Patent: Dec. 11, 2012

(54) PROJECTING ZOOM LENS AND PROJECTION TYPE DISPLAY APPARATUS

(75) Inventor: Masaru Amano, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 304 days.

(21) Appl. No.: 12/748,971

(22) Filed: Mar. 29, 2010

(65) Prior Publication Data

US 2010/0271601 A1 Oct. 28, 2010

(30) Foreign Application Priority Data

Apr. 28, 2009 (JP) ................................ P2009-110161

(51) Int. Cl.
*G02B 15/177* (2006.01)
*G03B 21/14* (2006.01)
(52) U.S. Cl. ........... 353/101; 353/97; 359/676; 359/695
(58) Field of Classification Search .................... 353/97, 353/101, 122; 359/676, 680, 682, 694, 695
See application file for complete search history.

(56) References Cited

U.S. PATENT DOCUMENTS

| 2007/0263294 A1* | 11/2007 | Yamada et al. | 359/680 |
| 2011/0109975 A1* | 5/2011 | Amano | 359/682 |

FOREIGN PATENT DOCUMENTS

| JP | 2001-350096 A | 12/2001 |
| JP | 2003-337283 A | 11/2003 |
| JP | 2004-70306 A | 3/2004 |
| JP | 2005-62226 A | 3/2005 |
| JP | 2005-84455 A | 3/2005 |

\* cited by examiner

*Primary Examiner* — Kevin Pyo
(74) *Attorney, Agent, or Firm* — Birch Stewart Kolasch & Birch, LLP

(57) ABSTRACT

The projecting zoom lens includes, sequentially from its magnification side, a negative first lens group, a positive second lens group, a negative third lens group, a positive fourth lens group, a positive or negative fifth lens group, and a positive six lens group, while the reduction side of the projecting zoom lens is formed as a telecentric system. When the power of the zoom lens is varied, the first lens group and sixth lens group are fixed, while the second to fifth lens groups move. In such power varying operation, the movement of the third lens group advances from the magnification side to the reduction side as the zoom lens goes from the wide angle end toward the tele end.

11 Claims, 22 Drawing Sheets

EXAMPLE 1 (WIDE)

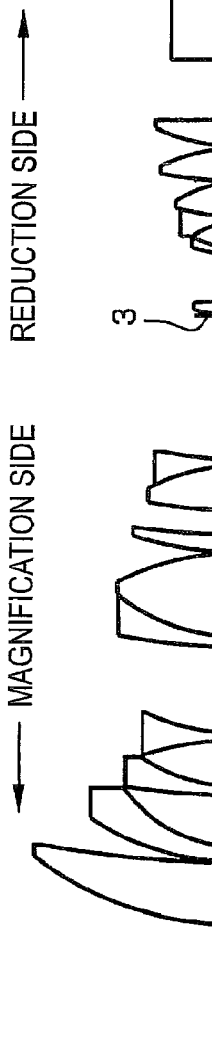
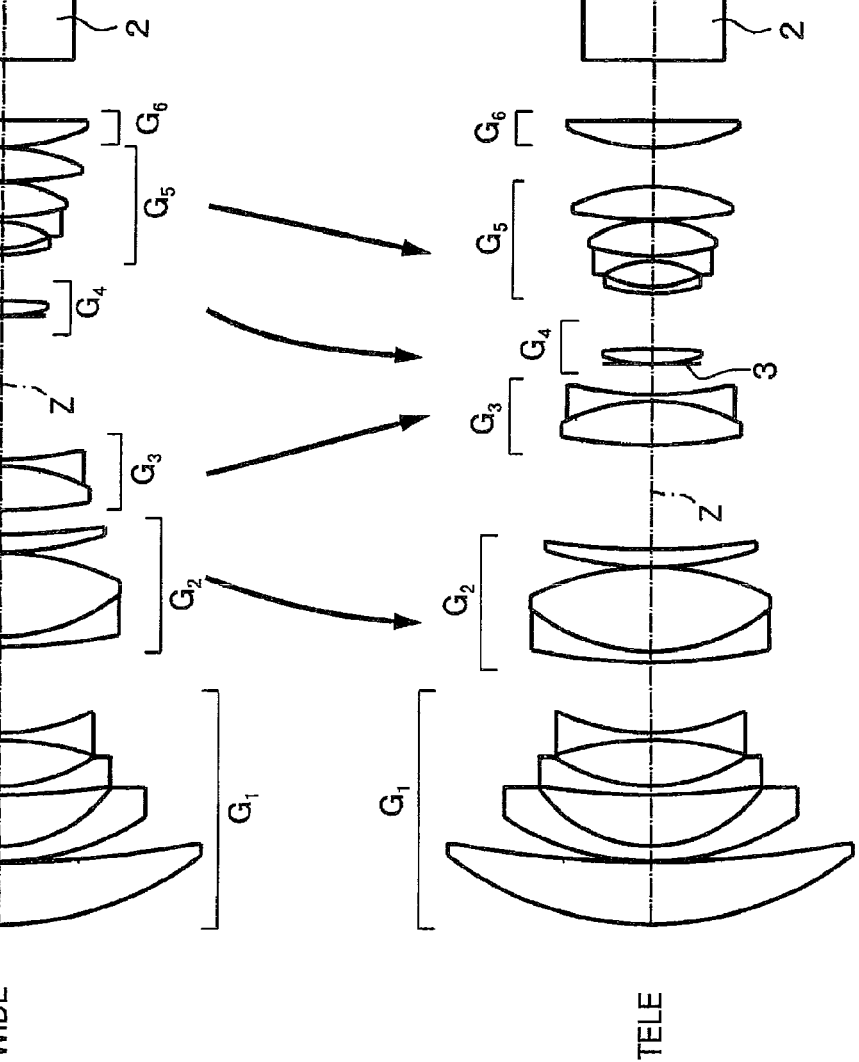
FIG. 2

EXAMPLE 6 (WIDE)

FIG. 13 EXAMPLE 7 (WIDE)

FIG. 15    EXAMPLE 1
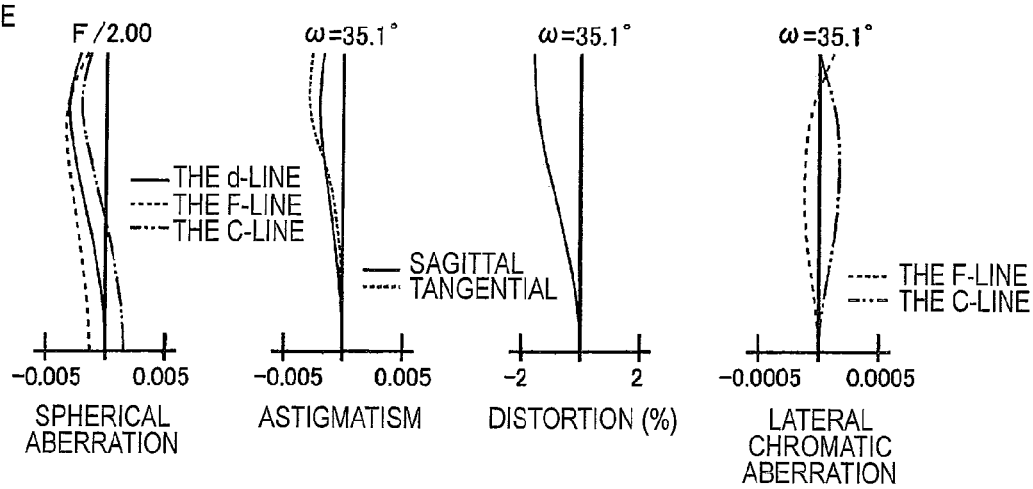
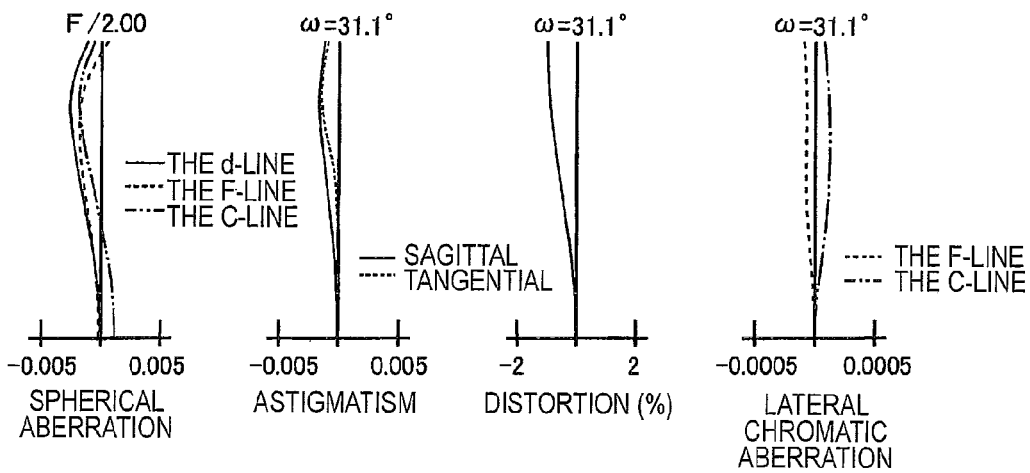
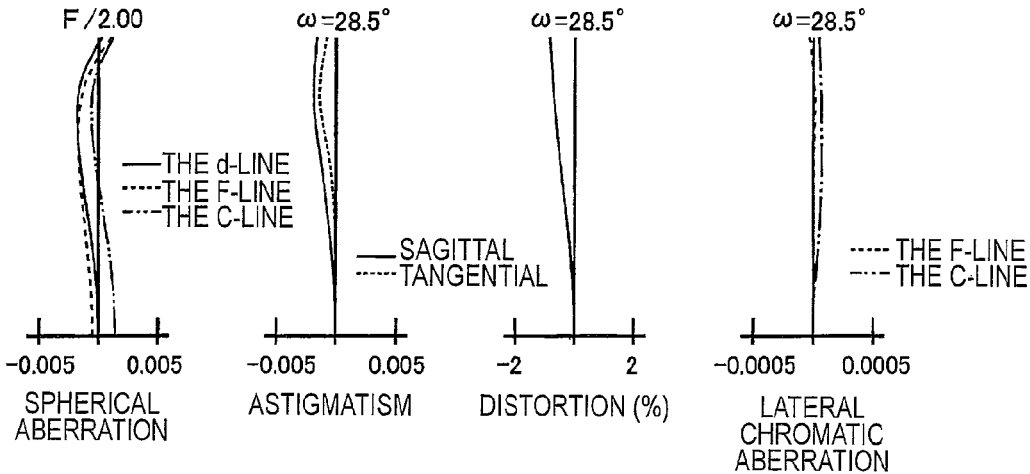

FIG. 17
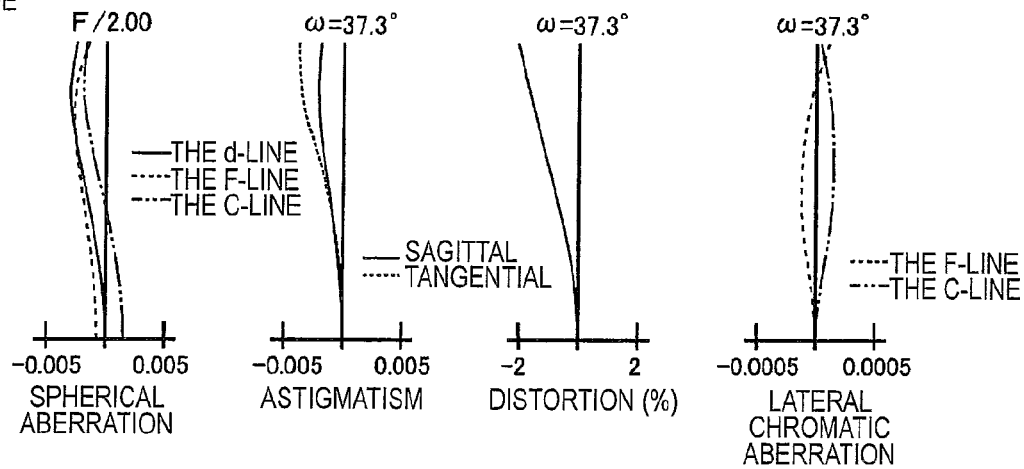
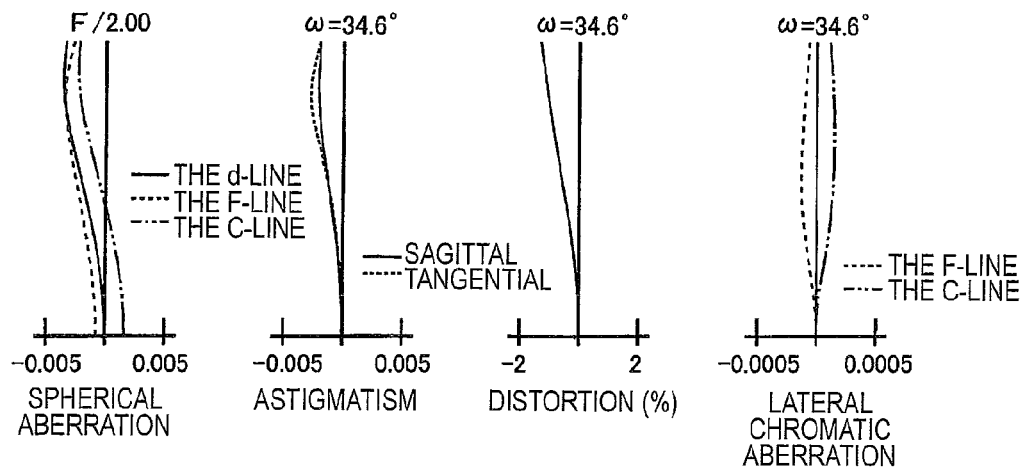
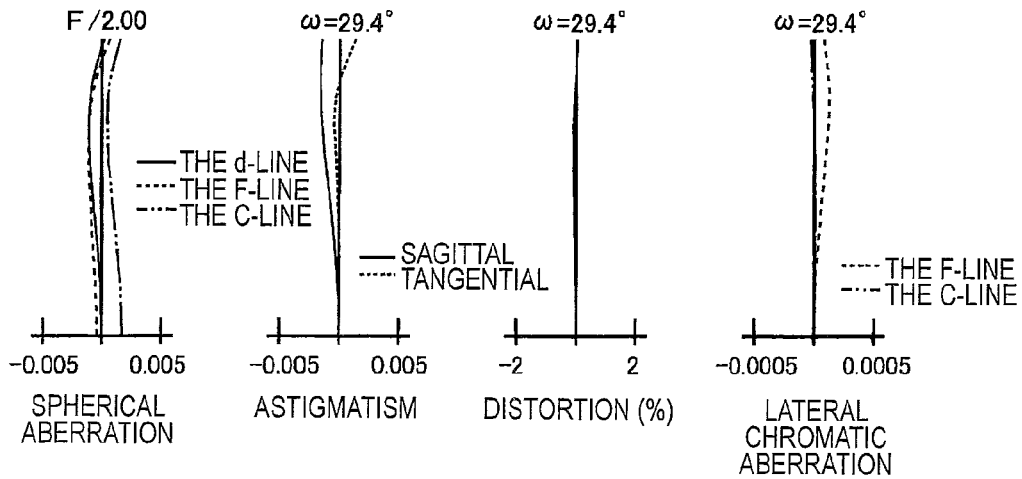

FIG. 18  EXAMPLE 4

FIG. 19
EXAMPLE 5
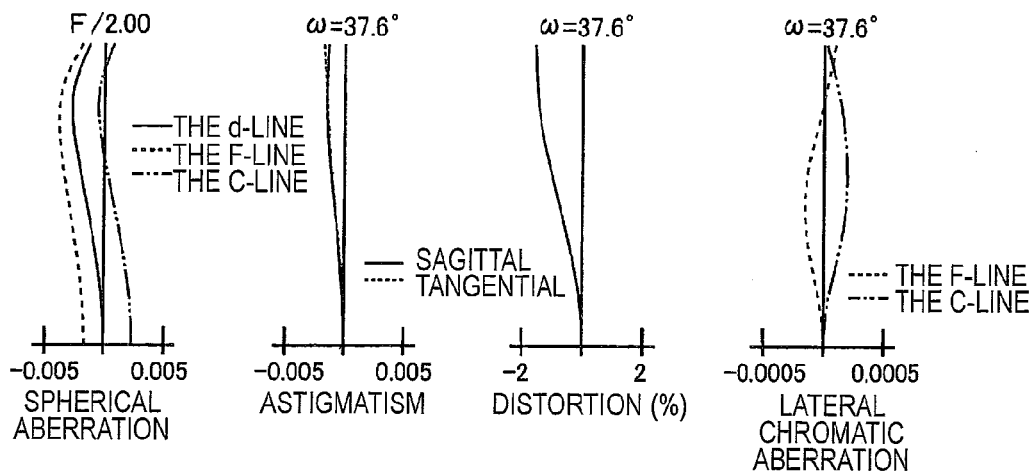
WIDE
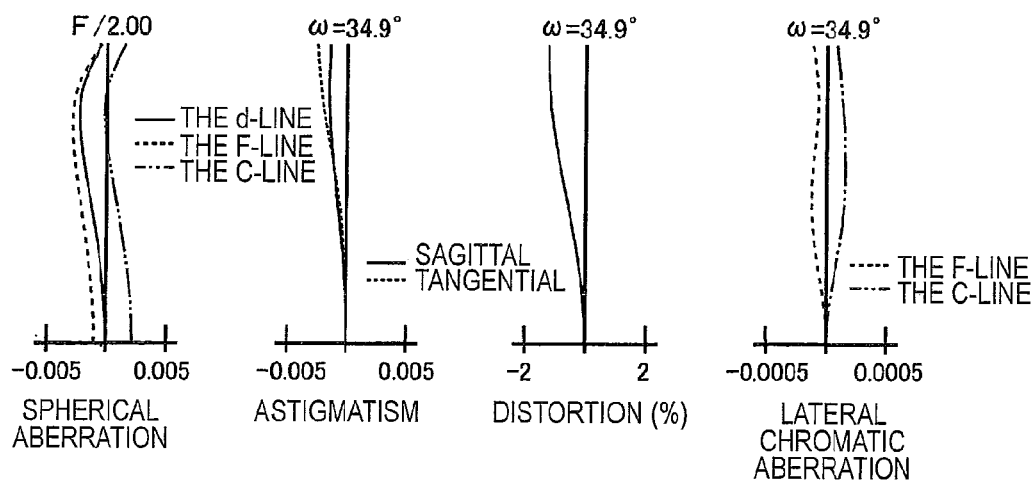
MIDDLE
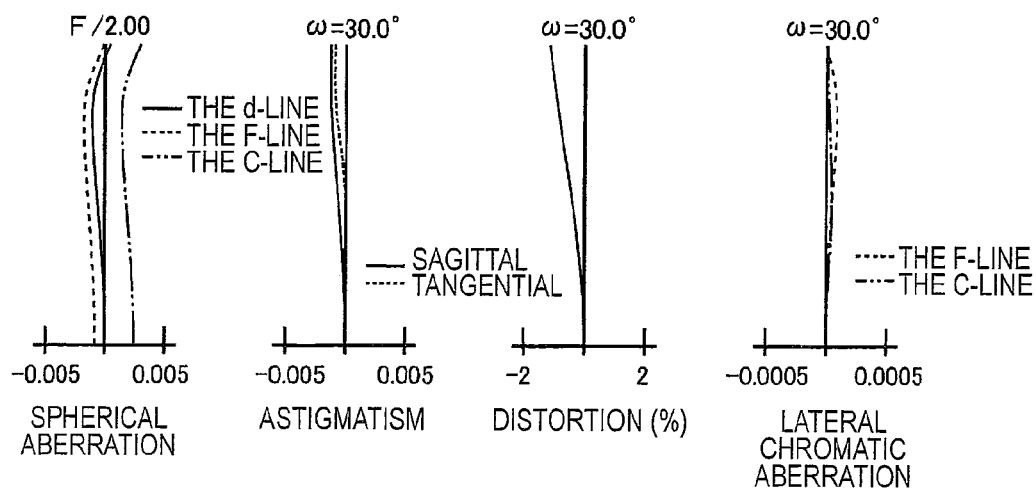
TELE

FIG. 20   EXAMPLE 6

FIG. 21
EXAMPLE 7
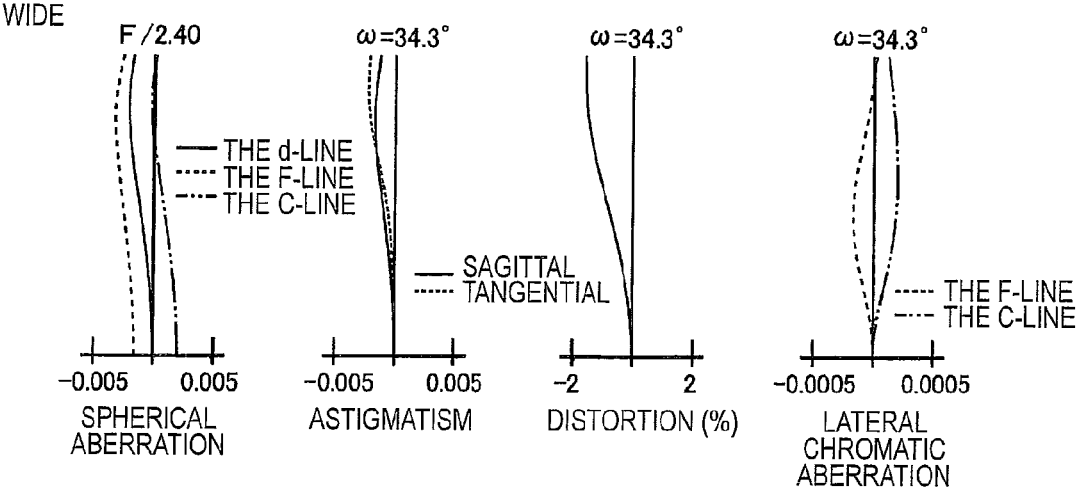
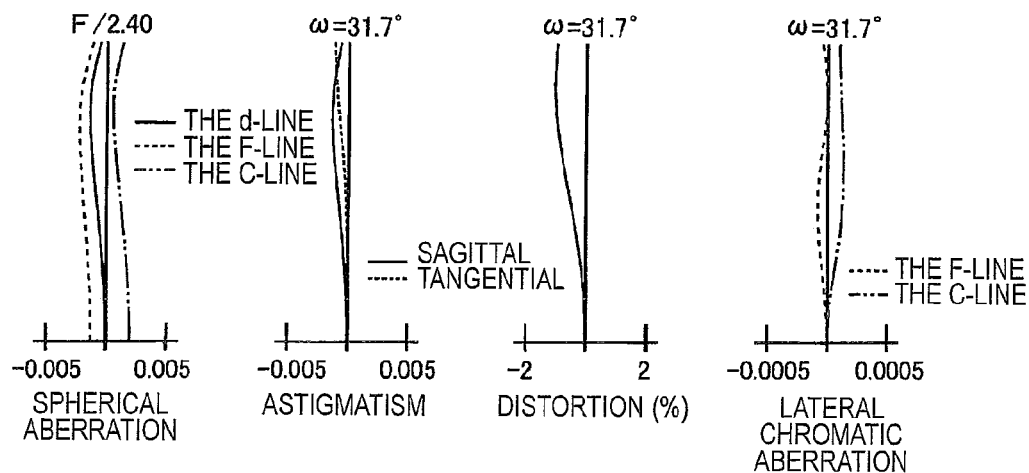
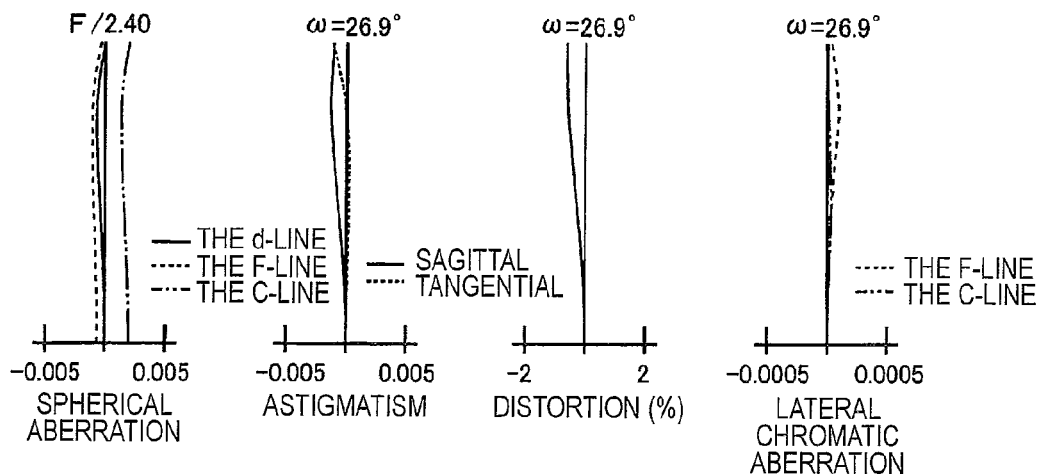

PROJECTING ZOOM LENS AND PROJECTION TYPE DISPLAY APPARATUS

The present application claims priority from Japanese Patent Application No. 2009-110161 filed on Apr. 28, 2009, the entire content of which is incorporated herein by reference.

BACKGROUND OF INVENTION

1. Field of the Invention

The present invention relates to a projecting zoom lens to be mounted on a projection type display apparatus and having a six lens group structure including three or four moving lens groups, and a projection type display apparatus with such projecting zoom lens mounted thereon.

2. Description of the Related Art

Recently, a transmission type or a reflection type liquid crystal display apparatus and a projector apparatus (a projection type display apparatus) such as a DMD display apparatus using a light valve have been widely spread and have been enhanced in their functions. Especially, with enhancement in the resolution of the light valve, there has been increasing a request to enhance the resolving power of the projecting lens.

Also, in order to enhance the freedom to set the distance between the projection type display apparatus and a screen as well as to enhance the possibility of installation of the apparatus in a narrow indoor space, there has been increasing a request to mount a higher-performance wide zoom lens or a high-power zoom lens onto the projection type display apparatus having a compact structure. In view of this, there have been made various proposals which aim at realizing such request (see JP-A-2001-350096, JP-A-2004-70306, and JP-A-2005-62226).

On the other hand, due to such enhancement in the resolution of the light valve and the resolving power of the projecting lens, there is raised a big problem that the properties of the light valve and projecting lens in the whole zooming area ranging from a wide angle end to a tele end are caused to vary. For example, in order to correspond to the enhanced resolution of the light valve, there is requested a fast lens having a large aperture so that light having passed through pixels may arrive at the screen without losing the amount of the light. However, generally, when the resolving power of the lens varies from the wide angle end to the tele end, the fastness (that is, Fno.) of the lens increases, which results in the dark screen.

Also, as a projecting zoom lens in which the number of moving lens groups of zoom lens is increased to aim at enhancing the optical performance in the whole zooming area from the wide angle end to the telephoto end, there is known the projecting lens that is disclosed in JP-A-2003-337283. However, in this lens, there is raised a problem that the variable amount of spherical aberration caused when the power of the lens is varied and, especially, in the tele end, the marginal rays are large to thereby provide an under-fastness tendency.

In view of this, as disclosed in JP-A-2005-84455, there is proposed a projecting lens in which, of 6 lens groups forming a zoom lens, in the third lens group, there is disposed a surface having a strong negative refractive power to thereby reduce the amount of variations in the spherical aberration caused when the power of the lens is varied.

As described above, there is found a problem that the properties of the lens are caused to vary according to the variable power: that is, when the projection distance is varied depending on the size of a projection space in a room, the image of an object cannot be projected on the screen with the same brightness; and thus, there has been increasing a request to take proper measures against this problem quickly.

Also, in the projecting zoom lens disclosed in the above JP-A-2005-84455, although the varying amount of the spherical aberration caused by the variable power is reduced, there is raised a problem that the properties of the lens are caused to vary according to the variable power: that is, the astigmatism of the lens increases.

SUMMARY OF INVENTION

The present invention aims at solving the above problems and thus it is an object of the invention to provide a projecting zoom lens capable of reducing the above-mentioned variations in the lens properties caused by the variable power and a projection type display apparatus including such projecting zoom lens.

A first projecting zoom lens according to the invention is a projecting zoom lens for radiating a light beam from a light source onto a light valve, modulating the light beam according to a given image displayed on the light valve and projecting an optical image formed according to the modulated light beam onto a screen. Specifically, the first projecting zoom lens comprises: at least two moving lens groups which are allowed to move when varying the power of the projecting zoom lens; and, a variable diaphragm interposed between the mutually adjoining ones of the moving lens groups or in the moving lens groups. The variable diaphragm is structured such that, in the whole power varying area, the diaphragm diameter may be varied so as to be able to uniform the light amount of the light beam allowed to pass through the variable diaphragm, and the reduction side of the diaphragm is formed as a telecentric system.

Also, a second projecting zoom lens according to the invention is a projecting zoom lens, comprising sequentially from the magnification side thereof: a first lens group having a negative refractive power; a second lens group having a positive refractive power; a third lens group having a negative refractive power; a fourth lens group having a positive refractive power; a fifth lens group having a positive or negative refractive power; and, a sixth lens group having a positive refractive power. In the second projecting zoom lens, its reduction side is formed as a telecentric system. When the power of the zoom lens is varied, the distances between the respective lenses of the second and sixth lens groups are respectively allowed to vary; and, as for the movement of the third lens group in the power varying operation, as the zoom lens goes from the wide angle end to the tele end, the third lens group is allowed to move along the optical axis from the magnification side to the reduction side, and also the following conditional expression (1) must be satisfied, that is, $|M2/M3|<1.0$ - - - (1), where Mi: the amount of the zooming movement of the i-th lens group along the optical axis from the wide angle end to the tele end.

Here, according to a preferred mode for carrying out the operations of the respective lens groups in the power varying operation, the first and sixth lens groups may be fixed; the third, fourth and fifth lens groups may be moved; and, the second lens group may be fixed or moved.

Also, the above-mentioned expression "the amount of the zooming movement along the optical axis from the wide angle end to the tele end" means the distance between the wide angle end position and tele end position.

Also, a third projecting zoom lens according to the invention is structured such that, in the second projecting zoom lens, a variable diaphragm is interposed between the third and fourth lens groups. And, preferably, the variable diaphragm may be structured such that, in the whole power varying area, its diaphragm diameter may be varied so as to be able to make constant the light amount of the light beam which is allowed to pass through the variable diaphragm.

A fourth projecting zoom lens according to the invention is the first or third projecting zoom lens, in which the following conditional expression (2) may be preferably satisfied: that is, |fBw/fw|<1.5, where fBw: the distance at the wide angle end, of all lens surfaces situated on the reduction side from the variable diaphragm, from the surface top position of the lens surface situated at the deepest position on the magnification side to the magnification side focal point position; and, fw: the focal distance of the whole lens system at the wide angle end.

A fifth projecting zoom lens according to the invention is any one of the first, third and fourth projecting zoom lens, in which the following conditional expression (3) may be preferably satisfied: that is, |fBt−fBw|/fw<1.2 - - - (3), where fBt: the distance at the tele end, of all lens surfaces situated from the variable diaphragm to the reduction side, from the surface top position of the lens surface situated at the deepest position on the magnification side to the magnification side focal point position; fBw: the distance at the wide angle end, of all lens surfaces situated from the variable diaphragm to the reduction side, from the surface top position of the lens surface situated at the deepest position on the magnification side to the magnification side focal point position; and, fw: the focal distance of the whole lens system at the wide angle end.

A sixth projecting zoom lens according to the invention is one of the first and third to fifth projecting zoom lenses, in which, preferably, the lens group disposed at the deepest position on the magnification side may be made of a lens group having a negative refractive power which, in the power varying operation, is fixed and has a focusing function; and, the lens group disposed at the deepest position on the reduction side may be made of a lens group which has a positive refractive power and, in the power varying operation, is fixed.

A seventh projecting zoom lens according to the invention is one of the second to sixth projecting zoom lenses in which the following conditional expression (4) may preferably be satisfied: that is, $06<|f1/fw|<1.5$ - - - (4), where f1: the focal distance of the first lens group; and, fw: the focal distance of the whole lens system at the wide angle end.

An eighth projecting zoom lens according to the invention is any one of the second to seventh zoom lenses in which, preferably, its focused state may be adjusted by moving the first lens group along the optical axis.

A ninth projecting zoom lens according to the invention is any one of the second to eighth zoom lenses in which, preferably, the following conditional expression (5) may be satisfied: that is, $1.7<N_{1G}$ - - - (5), where $N_{1G}$: the average value of the refractive indexes of the respective lenses of the first lens group.

A tenth projecting zoom lens according to the invention is any one of the second to ninth zoom lenses in which, preferably, the third lens group may be made of a cemented lens including a biconvex lens and a biconcave lens sequentially in this order from the magnification side.

An eleventh projecting zoom lens according to the invention is any one of the second to ten projecting zoom lenses in which, preferably, the following conditional expression (6) may be satisfied: that is, $2\omega>60°$ - - -(6), where $2\omega$: the whole angle of view at the wide angle end.

A projection type display apparatus according to the invention comprises: a light source; a light valve; an illuminating optical portion for guiding a light beam from the light source onto the light valve; and, a projecting zoom lens as set forth in any one of the first to eleventh projecting zoom lenses and having a reduction side formed as a telecentric system, wherein the light beam from the light source is light modulated by the light valve and the modulated light beam is projected onto a screen by the projecting zoom lens.

Here, the expression "magnification side" means a projected side (screen side) and, even when the image is projected in a reduced manner, for convenience' sake, the screen side is referred to as the magnification side. On the other hand, the expression "reduction side" means an original image display area side (light valve side) and, even when the image is projected in a reduced manner, for convenience' sake, the light valve side is called the reduction side.

According to the first projecting zoom lens according to the invention and a projection type display apparatus using such projecting zoom lens, there are provided: at least two moving lens groups which are allowed to move when varying the power of the projecting zoom lens; and, a variable diaphragm interposed between the mutually adjoining ones of the moving lens groups or in the moving lens groups, wherein the variable diaphragm is structured such that, in the whole power varying area, its diaphragm diameter may be varied so as to be able to make constant the light amount of the light beam which is allowed to pass through the diaphragm.

Thanks to this structure, while maintaining a high zooming ratio, the angle of the zoom lens may be widened easily and, in the angle widened state as well, in the whole area of the power varying operation, the fastness (Fno.) may be kept substantially constant.

Therefore, according to the invention, there may be provided a projecting zoom lens of a high resolving power which may reduce variations in the properties thereof possibly caused by the power varying operation, and a projection type display apparatus including such projecting zoom lens.

According to the second projecting zoom lens according to the invention and a projection type display apparatus using such projecting zoom lens, sequentially from the magnification side thereof, there are included: a first lens group having a negative refractive power; a second lens group having a positive refractive power; a third lens group having a negative refractive power; a fourth lens group having a positive refractive power; a fifth lens group having a positive or negative refractive power; and, a sixth lens group having a positive refractive power. When the power of the zoom lens is varied, the first and sixth lens groups are respectively fixed; the third to fifth lens groups are respectively allowed to move; and, the second lens group is fixed or moved. In such power varying operation, the third lens group is allowed to move along the optical axis from the magnification side to the reduction side as the zoom lens goes from the wide angle end toward the tele end. Also, the range of ratios between the amounts of the zooming movements of the second and third lens groups $G_2$ and $G_3$ is regulated.

Thanks to this, while attaining the object to widen the angle of field of the zoom lens, in the whole area of the power varying operation, it is possible to reduce the amounts of variations in various aberrations including spherical aberrations and astigmatism.

This makes it possible to provide a projecting zoom lens of a high resolving power which may reduce such variations in its properties possibly caused by the power varying operation, and a projection type display apparatus using such projecting zoom lens.

Further, according to the first and second projecting zoom lenses and projection type display apparatus including such projecting zoom lenses, it is possible to satisfy the request that the telecentricity of the reduction side of the lens system may be enhanced.

BRIEF DESCRIPTION OF THE DRAWINGS

FIG. 2 is a view to show the moving positions of the respective lens groups of the projecting zoom lens according to the example 1 at the wide angle end and tele end thereof;

FIG. 15 shows the respective aberrations of the projecting zoom lens according to the example 1 at the wide angle end, middle position and tele end;

FIG. 17 shows the respective aberrations of the projecting zoom lens according to the example 3 at the wide angle end, middle position and tele end;

FIG. 19 shows the respective aberrations of the projecting zoom lens according to the example 5 at the wide angle end, middle position and tele end;

FIG. 21 shows the respective aberrations of the projecting zoom lens according to the example 7 at the wide angle end, middle position and tele end.

DESCRIPTION OF EXEMPLARY EMBODIMENTS

Figure 1:
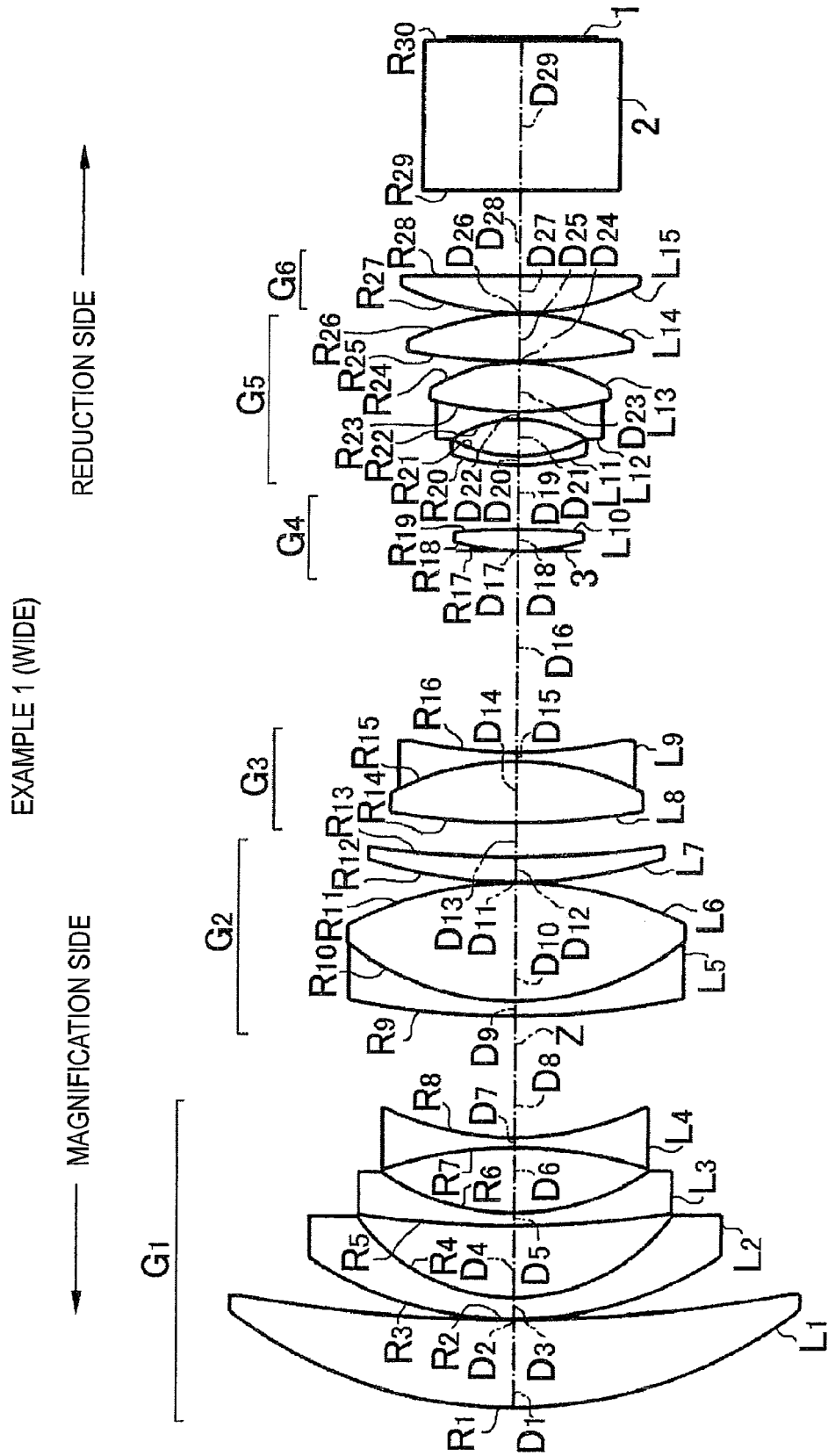
FIG. 1 is a structure view of a projecting zoom lens according to an example 1.

Now, description will be given below of a first embodiment according to the invention with reference to the accompanying drawings. FIG. 1 is a structure view of a projecting zoom lens according to an example 1 at its wide angle end. From now on, description will be given of the first embodiment while this lens is regarded as a typical example (specifically, the first embodiment may correspond to claim 1 and examples 1~7).

That is, this is a lens which is used as a projecting zoom lens to be carried on a projecting type display apparatus. For example, the present lens includes, sequentially in order starting from the magnification side, a first lens group $G_1$ which a negative refractive power and, when varying the power of the zoom lens, is fixed and having a focusing function; a second lens group $G_2$ having a positive refractive power, a third lens group $G_3$ having a negative refractive power, a fourth lens group $G_4$ having a positive refractive power, and a fifth lens group $G_5$ having a positive or negative refractive power which, when the power of the zoom lens is varied successively, are allowed to move in linking with each other in order to correct the successively varying powers and the movements of the field caused by such successive varying powers; and, a sixth lens group $G_6$ which has a positive refractive power and, when the power of the zoom lens is varied, is fixed. Here, in such power varying operation, the second lens group $G_2$ may also be fixed.

Also, in the above moving lens groups, between the lens groups $G_2$~$G_5$, or in the groups $G_2$~$G_5$, there is disposed an aperture (a variable diaphragm) 3 (in the example 1, it is disposed in the fourth lens group $G_4$). This variable diaphragm 3 is structured such that, when varying the power of the zoom lens, in the whole area of the power varying operation, its aperture diameter (diaphragm diameter) may be varied in order to be able to uniformly take in the light modulated by the light valve. Also, the present lens system is structured such that its reduction side is substantially telecentric (provides a telecentric system).

Also, as shown in the drawings, the first lens group $G_1$ includes four (in the embodiments 3 and 5, five lenses; and, in the embodiment 4, three lenses) lenses $L_1$~$L_4$, the second lens group $G_2$ includes three (in the embodiments 2 and 3, two lenses) lenses $L_5$~$L_7$, the third lens group $G_3$ includes two lenses $L_8$ and $L_9$, the fourth lens group $G_4$ includes one (in the embodiments 2 and 3, two lenses) lens $L_{10}$, the fifth lens group $G_5$ includes four (in the embodiment 3, five lenses) lenses $L_{11}$~$L_{14}$, and the sixth lens group $G_6$ includes a single lens $L_{15}$, respectively.

Owing to this structure, even when it is necessary to vary the projection distance according to the projection space, by moving the second lens group $G_2$, third lens group $G_3$, fourth lens group $G_4$ and fifth lens group $G_5$ in the optical axis direction, the power varying operation may be carried out; and, also, by moving the variable diaphragm 3 in the optical axis direction to carry out the power varying operation, an image of high quality corresponding to the above request may be projected on the screen with the same brightness.

Also, the first embodiment of the invention satisfies the following conditional expression (2). That is, $|fBw/fw|<1.5$ - - - (2). Here, fBw: of all lens surfaces situated nearer to the reduction side than the variable diaphragm 3, the distance at a wide angle end from the vertex position of a lens surface situated nearest to the magnification side to the magnification side focal point position of such lens surface; and, fw: the focal distance of the whole lens system at the wide angle end.

This conditional expression (2) is used to determine the position of a pupil on the reduction side. Specifically, by determining the position of the pupil, the position of the variable diaphragm is determined. That is, when the first embodiment exceeds the upper limit of the conditional expression (2), the curvature of the field becomes excessively large, which makes it difficult to correct the aberration properly. By satisfying the conditional expression (2), proper aberration correction is possible and the variable diaphragm may be disposed in the neighborhood of the pupil.

Further, the first embodiment of the invention satisfies the following conditional expression (3). That is, $|fBt-fBw|/fw<1.2$ - - -(3). Here, fBt: of all lens surfaces situated nearer to the reduction side than the variable diaphragm 3, the distance at a wide angle end from the vertex position of a lens surface situated nearest to the magnification side to the magnification side focal point position of such lens surface; fBw: of all lens surfaces situated nearer to the reduction side than the variable diaphragm 3, the distance at a wide angle end from the vertex position of a lens surface situated nearest to the magnification side to the magnification side focal point position of such lens surface; and, fw: the focal distance of the whole lens system at the wide angle end.

The conditional expression (3) is used to determine the moving amount of a pupil. When this conditional expression (3) is satisfied, proper aberration correction is possible and the variable diaphragm may be disposed in the neighborhood of the pupil.

Here, the sixth lens group $G_6$ is a fixed relay lens when the power is varying and, between the sixth lens group $G_6$ and an image display surface 1 serving as a light valve, there is interposed a dichroic prism 2 (which includes various filters such as a low pass filter) (this structure will apply similarly in the following description). The dichroic prism 2 may includes cross dichroic prism. In the embodiments 2 and 4~7, there are disposed a dichroic prism 2a and a cover glass 2b of a light valve. Also, in the drawings, a reference sign "Z" designates an optical axis.

Now, description will be given below of a second embodiment of the invention with reference to the accompanying drawings. In the second embodiment, description will be given while the lens according to the example 1 is regarded as a typical example (the second embodiment corresponds to claim 2 and examples 1 and 5~7).

The projecting zoom lens according to the present embodiment includes, sequentially in order starting from the magnification side, a first lens group $G_1$ which a negative refractive power and, when varying the power of the zoom lens, is fixed and having a focusing function; a second lens group $G_2$ having a positive refractive power, a third lens group $G_3$ having a negative refractive power, a fourth lens group $G_4$ having a positive refractive power, and a fifth lens group $G_5$ having a positive or negative refractive power which, when the power of the zoom lens is varied successively, are allowed to move in linking with each other in order to correct the successively varying powers and the movements of the field caused by such successive varying powers; and, a sixth lens group $G_6$ which has a positive refractive power and, when the power of the zoom lens is varied, is fixed. Here, in such power varying operation, the second lens group $G_2$ may also be fixed. Also, the reduction side of the zoom lens is formed telecentric.

Also, as shown in the drawings, preferably, the first lens group $G_1$ may include four (in the example, five lenses) lenses $L_1$~$L_4$, the second lens Group $G_2$ may include three lenses $L_5$~$L_7$, the third lens group $G_3$ may include two lenses $L_8$ and $L_9$, the fourth lens group $G_4$ may include one lens $L_{10}$, the fifth lens group $G_5$ may include four lenses $L_{11}$~$L_{14}$, and the sixth lens group $G_6$ may include a single lens $L_{is}$.

Also, between or in the lens groups $G_2$~$G_5$ serving as the moving groups, there may be disposed the aperture (variable diaphragm) 3 (in the example 1, it is disposed in the fourth lens group $G_4$). Also, preferably, the variable diaphragm 3 may be structured such that, in order to be able to uniformly take in the light modulated by the light valve, when varying the power of the zoom lens, its aperture diameter (diaphragm diameter) may be varied in the whole area of the power varying operation.

Owing to this structure, even when the projection distance must be varied according to the projection space, the second lens Group $G_2$, third lens group $G_3$, fourth lens group $G_4$ and fifth lens group $G_5$, or the third lens group $G_3$, fourth lens group $G_4$ and fifth lens group $G_5$ may be moved in the optical axis direction to thereby carry out the power varying operation and also the variable diaphragm 3 may be moved in the optical axis direction to thereby carry out the power varying operation, whereby an image, which corresponds to a request and has proper quality, may be projected on the screen with the brightness.

Also, referring to the movement of the third lens group $G_3$, in the power varying operation, as the zoom lens goes from the wide angle end toward the tele end, the third lens group $G_3$ moves along the optical axis from the magnification side to the reduction side. Thanks to this, while maintaining the high optical performance of the zoom lens, the angle of the zoom lens may be widened.

Here, in order to correct on-axial and power color aberrations, it is preferred that the third lens group $G_3$ may be made of a cemented lens produced by connecting together a biconvex lens and a biconcave lens sequentially from the magnification side.

Also, the second embodiment of the invention may preferably satisfy the following conditional expressions (1), (4)~(6) and, more preferably, may satisfy the above-mentioned conditional expressions (2) and (3).

That is, the second embodiment of the invention firstly satisfies the following conditional expression (1). $|M1/M2/M3|<1.0$ - - - (1). Here, Mi: the amount of the zooming movement of an i-th lens group along the optical axis from the wide angle end to the tele end.

This conditional expression (1) determines the range of the ratio of the zooming movement amounts of the second lens Group $G_2$ and third lens group $G_3$. When the ratio satisfies the conditional expression (1), variations in aberrations in the power varying operation may be reduced and a proper aberration correction may be carried out. Also, when the ratio exceeds the upper limit of the conditional expression (1), although the zooming ratio may be increased, variations in aberrations caused by the power variations increase, the whole system increases in size and further it is difficult to widen the angle of view. Thus, when the conditional expression (1) is satisfied, while maintaining the high optical performance of the zoom lens, it is possible to widen the field angle and the whole system may be made compact.

Also, the second embodiment of the invention satisfies the following conditional expression (4). That is, $0.6<|f_1/fw|<1.5$ - - - (4). Here, $f_1$: the focal distance of the first lens groups $G_1$, and fw: the focal distance of the whole lens system at the wide angle end.

This conditional expression (4) determines the power of the first lens groups $G_1$. When the second embodiment exceeds the conditional expression (4), the negative power of the first lens groups $G_1$ becomes too weak and, therefore, the outside diameter of the first lens groups $G_1$ must be increased and it is impossible to obtain a desired back focal length capable of satisfying a request. On the other hand, when the second embodiment goes below the conditional expression (4), the negative power of the first lens groups $G_1$ becomes too strong. This increases various aberrations such as a distortion aberration excessively, which makes it difficult for other lens groups to correct aberrations. On the other hand, when the conditional expression (4) is satisfied, the diameter of the first lens group $G_1$ may be reduced, a desired back focal length may be secured and various aberrations such as the distortion aberration may be enhanced.

Also, the second embodiment of the invention satisfies the following conditional expression (5). That is, $1.7 < N_{1G}$ - - - (5). Here, $N_{1G}$: the average value of the indexes of refraction of the respective lenses included in the first lens group $G_1$.

This conditional expression (5) determines the refraction indexes of the materials of the lenses included in the first lens group $G_1$. When the second embodiment goes below the lower limit of the conditional expression (5), the lens diameter becomes too large and it is difficult to widen the field angle.

Also, the second embodiment of the invention satisfies the following conditional expression (6). That is, $2\omega > 60°$ - - - (6), where $2\omega$: the whole field angle at a wide angle end.

When the second embodiment of the invention satisfies the following conditional expression (6), to widen the field angle, which is requested from a projecting zoom lens, is possible.

Here, the sixth lens group $G_6$ is a relay lens which is fixed in the power varying operation. Between the sixth lens group $G_6$ and image display surface 1, there is interposed a dichroic prism 2 (which includes various filters such as a low pass filter; and, in the examples 2 and 4~7, there are shown the dichroic prism 2a and a cover glass 2b of a light valve). Also, in the drawings, a reference sign "Z" designates an optical axis.

Figure 22:
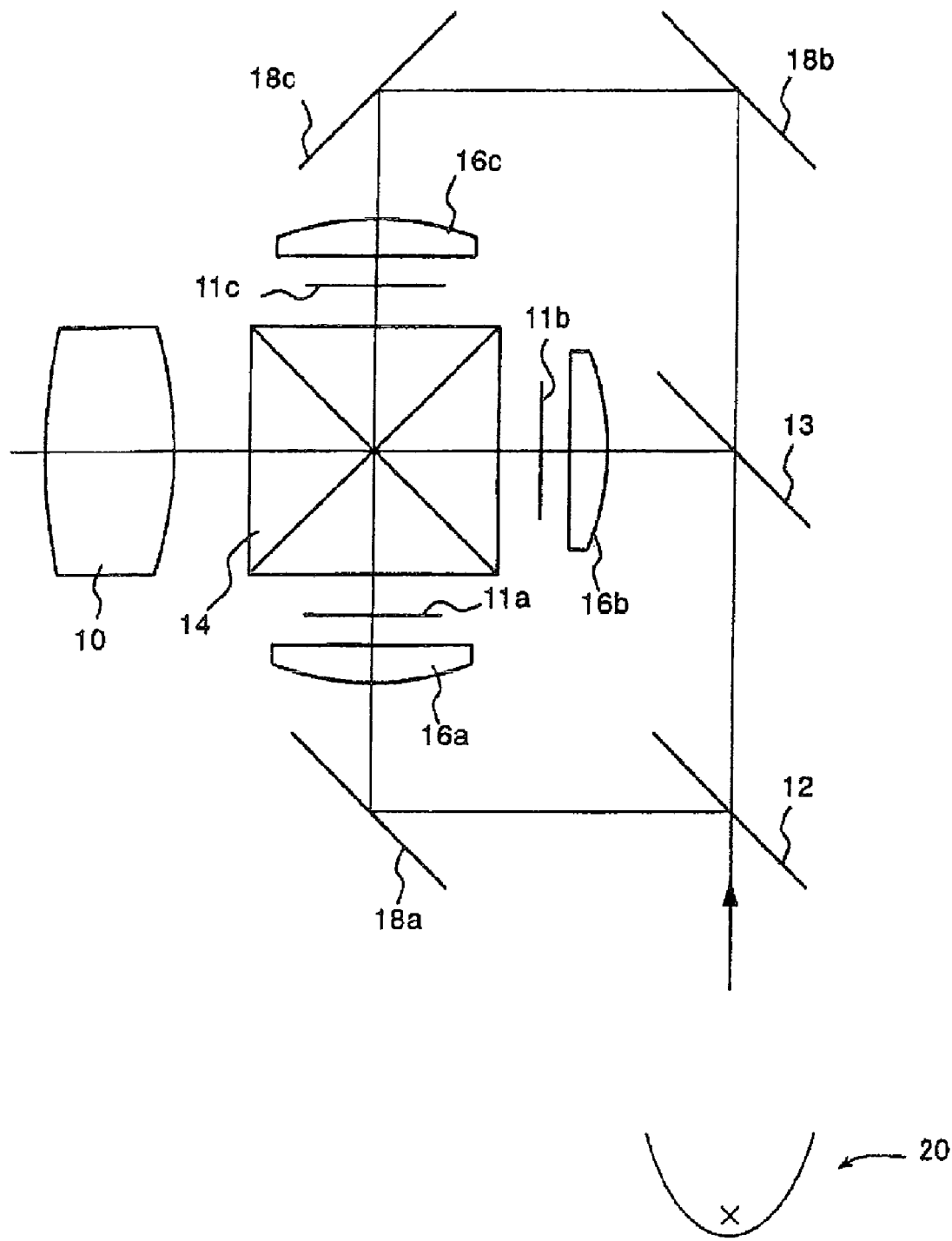
FIG. 22 is a schematic view of a portion of a projection type display apparatus according to an embodiment of the invention.

Next, description will be given here briefly of an embodiment of a projection type display apparatus according to the invention. FIG. 22 is a schematic structure view of a projection type display apparatus according to the present embodiment.

The projection type display apparatus shown in FIG. 22 includes transmission liquid crystal panels 11a~11c as light valves, and uses a projecting zoom lens according to above-mentioned embodiment as a projecting lens 10. Also, between a light source 20 and a dichroic mirror 12, there is interposed an integrator (not shown) such as a fly eye. The white light from the light source 20 is radiated into liquid crystal panels 11a~11c respectively corresponding to three color light beams (G light beam, B light beam and R light beam) and is light modulated there, is color synthesized by a cross dichroic prism 14, and is then projected on a screen (not shown) by the projecting lens 10. The present apparatus includes dichroic mirrors 12, 13 for color separation, a cross dichroic prism 14 for color synthesis, condenser lenses 16a~16c and total reflection mirrors 18a~18c. In the present projection type display apparatus, since a projecting zoom lens according to the present embodiment is used, the field angle may be widened and the projected image may have good image quality. Therefore, the present projection type display apparatus may provide a bright and compact projection type display apparatus.

Here, the projection type display apparatus shown in FIG. 22 is an embodiment of the invention and thus various changes are also possible. For example, as a light valve, of course, there may also be used a reflection type liquid crystal panel or a DMD.

Now, description will be given below further of a projecting zoom lens according to the invention using specific examples. Here, the following respective numeric value data such as R, D are regulated such that the focal distance at a wide angle end provides 1.

Example 1

A projecting zoom lens according to the present example 1, as described above, is structured as shown in FIG. 1. That is, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, and a fourth lens $L_4$ made of a biconcave lens. And, the second lens group $G_2$ includes, sequentially from the magnification side, a fifth lens $L_5$ made of a negative meniscus lens having a convex surface facing the magnification side, a sixth lens $L_6$ made of a biconvex lens, and a seventh lens $L_7$ made of a positive meniscus lens having a convex surface facing the magnification side, while the fifth lens $L_5$ and sixth lens $L_6$ are connected to each other to from a cemented lens.

Also, the third lens group $G_3$ includes, sequentially from the magnification side, an eighth lens $L_8$ made of a biconvex lens and a ninth lens $L_9$ made of a biconcave lens, while these eighth lens $L_8$ and ninth lens $L_9$ are connected together to form a cemented lens.

Also, the fourth lens groups $G_4$ includes only a tenth lens $L_{10}$ made of a biconvex lens. The fifth lens group $G_5$ includes, sequentially from the magnification side, an eleventh lens $L_{11}$ made of a negative meniscus lens having a convex surface facing the magnification side, a twelfth lens $L_{12}$ made of a biconcave lens, a thirteenth lens $L_{13}$ made of a biconvex lens, and a fourteenth lens $L_{14}$ made of a biconvex lens, while the twelfth lens $L_{12}$ and thirteenth lens $L_{13}$ are connected together to form a cemented lens. Also, the sixth lens group $G_6$ includes a single fifteenth lens $L_{15}$ made of a plano-convex lens having a convex surface facing the magnification side.

FIG. 2 shows the moving positions of the respective lens groups of the projecting zoom lens according to the example 1 at the wide end and tele end. As shown in FIG. 2, in the power varying operation, the first lens group $G_1$ and sixth lens group $G_6$ are used as fixed groups, while the second to fifth lens groups $G_2$ to $G_6$ are used as moving groups.

Also, the aperture (variable diaphragm) 3 is disposed in the fourth lens group $G_4$ and, in the power varying operation, it is allowed to move integrally with the tenth lens $L_{10}$. Also, the reduction side of the present lens system is formed substantially telecentric.

In Table 1, there are shown the values of the following items: that is, the radius of curvature R of the respective lens surfaces of the present projecting zoom lens; the center thicknesses of the respective lenses and the aerial spacings between the respective lenses (which are hereinafter referred to as on-axis surface spacings generically) D; and, the refractive indexes N and Abbe numbers v on the d line of the respective lenses. Here, in Table 1, numerals respectively express the sequence of places from the magnification side (this applies similarly in the following tables 2 to 7).

Here, in the lower stage of Table 1, there are shown the spacings between the respective lens groups at the wide angle end, at the middle point and at the tele end (when the projecting zoom lens is focused at an infinite distance; and, these apply similarly in the following tables 2 to 7).

Also, in the lower stage of Table 1, there are shown the aperture diameters (diaphragm diameters) of the aperture (variable diaphragm) 3 at the wide angle end, at the middle point and at the tele end. At the wide angle end, the spacing is 1.148, at the middle, 1.222 and, at the tele end, 1.266, whereby, even in the power varying operation, the fastness (Fno.) is prevented from varying.

TABLE 1

F = 1.00~1.16~1.29 (F: Focus distance)

| Surface Number | R | D | $N_d$ | $v_d$ |
|---|---|---|---|---|
| 1 | 4.264 | 0.799 | 1.7725 | 49.6 |
| 2 | 13.604 | 0.008 | | |
| 3 | 3.387 | 0.200 | 1.7130 | 53.9 |
| 4 | 1.765 | 0.658 | | |
| 5 | 9.242 | 0.116 | 1.7725 | 49.6 |
| 6 | 2.186 | 0.593 | | |
| 7 | −3.935 | 0.096 | 1.8052 | 25.4 |
| 8 | 2.711 | Movement 1 | | |
| 9 | 7.704 | 0.133 | 1.8052 | 25.4 |
| 10 | 2.436 | 1.092 | 1.8010 | 35.0 |
| 11 | −3.331 | 0.008 | | |
| 12 | 4.340 | 0.229 | 1.8052 | 25.4 |
| 13 | 9.445 | Movement 2 | | |
| 14 | 6.290 | 0.569 | 1.6393 | 44.9 |
| 15 | −2.450 | 0.084 | 1.8040 | 46.6 |
| 16 | 4.447 | Movement 3 | | |
| 17 Variable Diaphragm | ∞ | 0.000 | | |
| 18 | 2.097 | 0.197 | 1.4970 | 81.5 |
| 19 | −6.554 | Movement 4 | | |
| 20 | 2.077 | 0.084 | 1.5814 | 40.7 |
| 21 | 1.343 | 0.335 | | |
| 22 | −1.145 | 0.068 | 1.6990 | 30.1 |
| 23 | 2.950 | 0.454 | 1.4970 | 81.5 |
| 24 | −1.509 | 0.008 | | |
| 25 | 5.369 | 0.435 | 1.4970 | 81.5 |
| 26 | −2.310 | Movement 5 | | |
| 27 | 2.591 | 0.339 | 1.7440 | 44.8 |
| 28 | ∞ | 0.800 | | |
| 29 | ∞ | 1.372 | 1.5163 | 64.1 |
| 30 | ∞ | | | |

| (Movement Spacing) | Wide | Middle | Tele |
|---|---|---|---|
| Movement 1 | 1.110 | 0.972 | 0.914 |
| Movement 2 | 0.313 | 0.884 | 1.349 |
| Movement 3 | 1.858 | 1.041 | 0.400 |
| Movement 4 | 0.596 | 0.677 | 0.718 |
| Movement 5 | 0.012 | 0.313 | 0.507 |
| Diaphragm Diameter | 1.148 | 1.222 | 1.266 |

According to the projecting zoom lens of the example 1, as shown in Table 8, the conditional expressions (1)~(6) are all satisfied.

Also, FIG. 15 is an aberration view to show the spherical aberrations, astigmatisms, distortions and power chromatic aberrations of the projecting zoom lens according to the example 1 at the wide angle end, at the middle point and at the tele end. Here, in the astigmatism figures, there are shown aberrations with respect to sagittal image surfaces and tangential image surfaces (this applies similarly in FIGS. 16 to 21 as well).

As may be seen clearly from these aberration views, according to the projecting zoom lens of the example 1, the amount of variations in various aberrations including spherical aberrations and astigmatisms caused when zooming the projecting zoom lens may be reduced down to a very small amount and also such various aberrations may be corrected quite properly.

Also, according to the projecting zoom lens of the example 1, the values of the fastness (Fno.) of the zoom lens at the wide angle end, at the middle point and at the tele end are all 2.00, while the amount of variations of the fastness (Fno.) which is caused by the lens zooming operation is substantially 0.

Example 2

Figure 3:
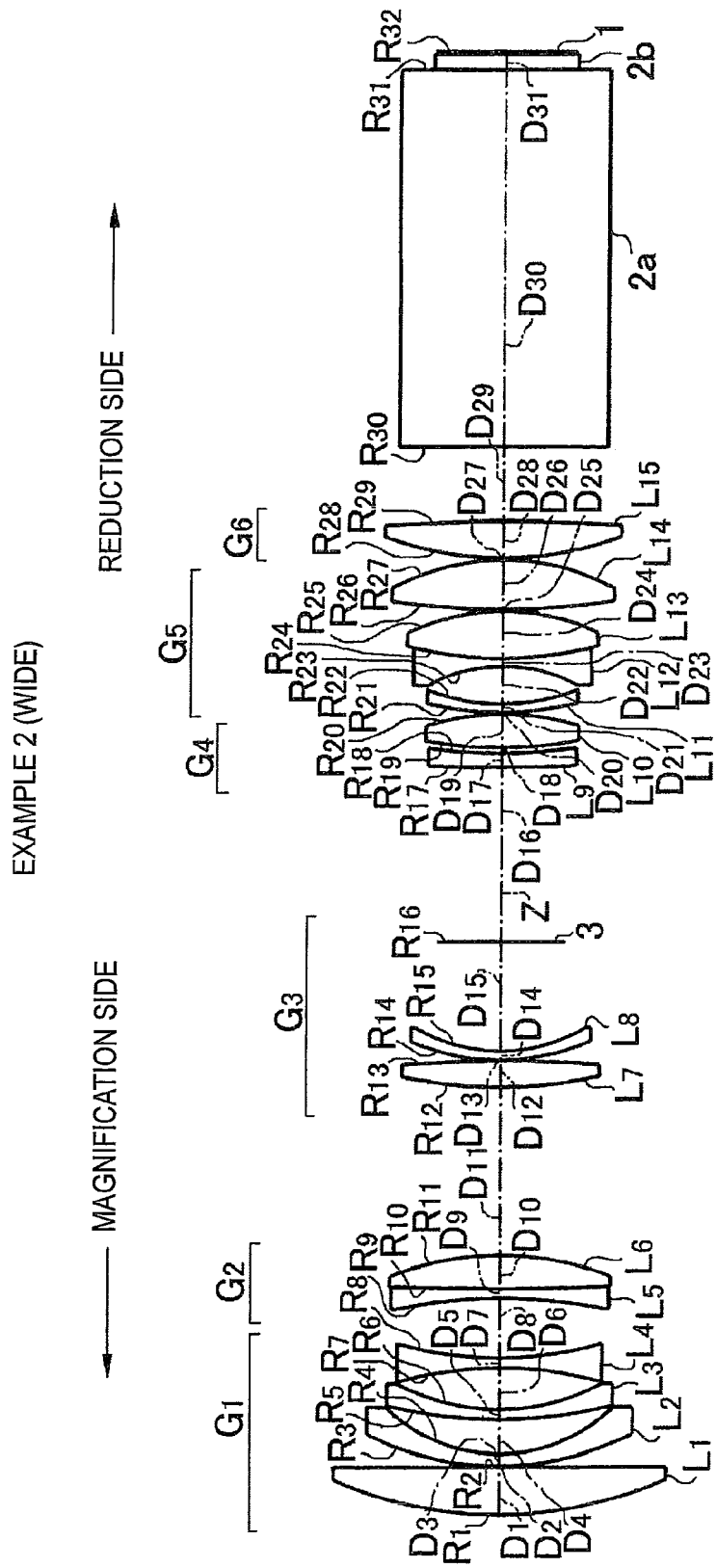
FIG. 3 is a lens structure view of a projecting zoom lens according to an example 2.

FIG. 3 shows a schematic structure of a projecting zoom lens according to an example 2. Basically, this projecting zoom lens, substantially similarly to the example 1, includes six lens groups. Specifically, the respective lens groups are structured in the following manner.

Firstly, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, and a fourth lens $L_4$ made of a biconcave lens. And, the second lens group $G_2$ is made of a cemented lens which includes, sequentially from the magnification side, a fifth lens $L_5$ made of a biconcave lens and a sixth lens $L_6$ made of a biconvex lens, while the fifth and sixth lens are connected together.

Also, the third lens group $G_3$ includes, sequentially from the magnification side, a seventh lens $L_7$ made of a biconvex lens, and an eighth lens $L_8$ made of a negative meniscus lens having a convex surface facing the magnification side. And, the fourth lens groups $G_4$ includes, sequentially from the magnification side, a ninth lens $L_9$ made of a negative meniscus lens having a convex surface facing the magnification side, and a tenth lens $L_{10}$ made of a biconvex lens.

Also, the fifth lens group $G_5$ includes, sequentially from the magnification side, an eleventh lens $L_{11}$ made of a negative meniscus lens having a convex surface facing the magnification side, a twelfth lens $L_{12}$ made of a biconcave lens, a thirteenth lens $L_{13}$ made of a biconvex lens, and a fourteenth lens $L_{14}$ made of a biconvex lens, while the twelfth lens $L_{12}$ and thirteenth lens $L_{13}$ are connected together to form a cemented lens. Further, the sixth lens group $G_6$ includes only a fifteenth lens $L_{15}$ made of a biconvex lens.

Figure 4:
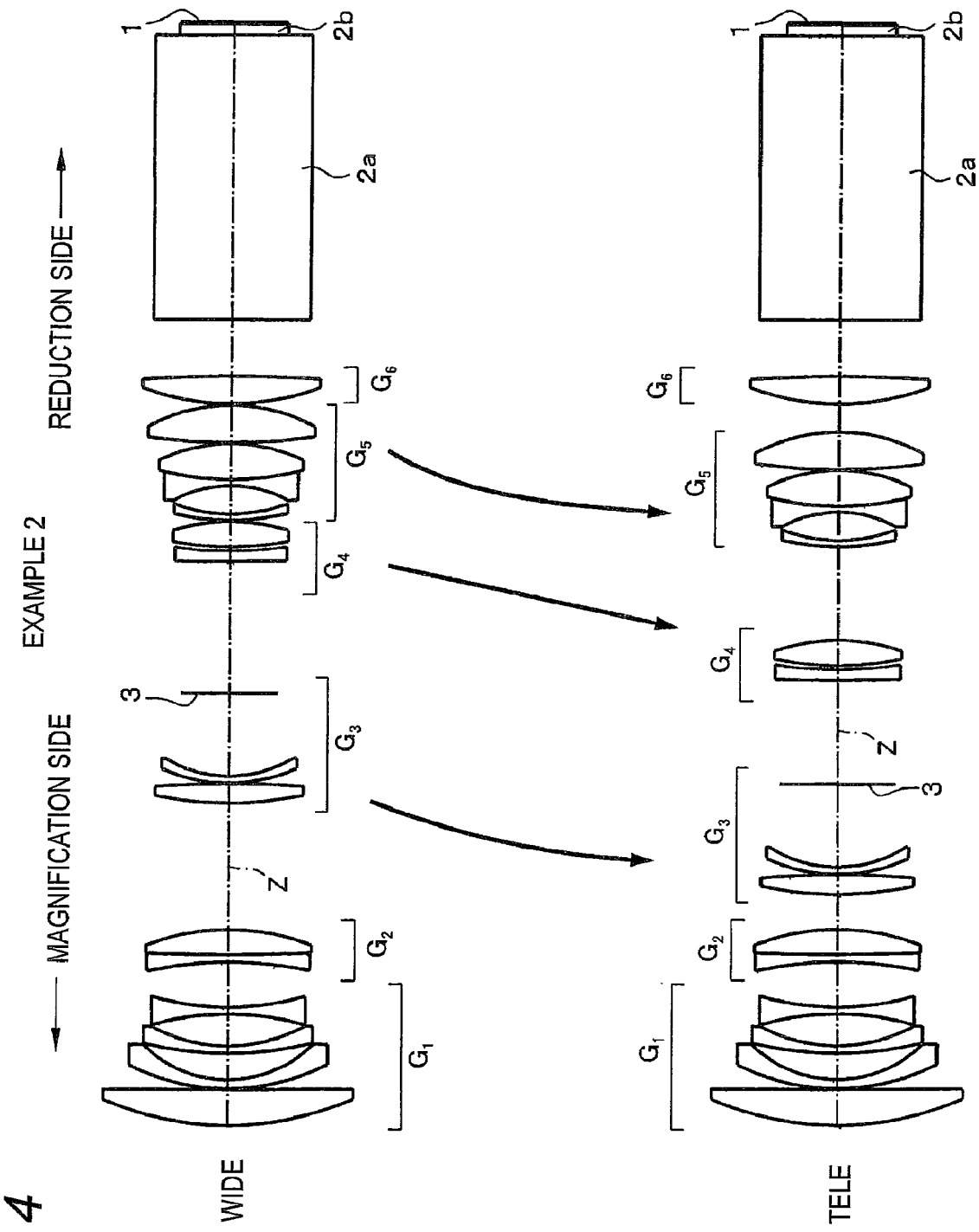
FIG. 4 is a view to show the moving positions of the respective lens groups of the projecting zoom lens according to the example 2 at the wide angle end and tele end thereof.

FIG. 4 shows the moving positions of the respective lens groups of the projecting zoom lens according to the example 2 at the wide angle end, at the middle point and at the tele end. As shown in FIG. 4, in the power varying operation, the first lens group $G_1$, second lens group $G_2$ and sixth lens group $G_6$ are used as fixed lens groups, while the third to fifth lens groups $G_3$ to $G_5$ are used as moving lens groups.

Also, the aperture (variable diaphragm) 3 is disposed in the third lens group $G_3$ and is structured such that, in the power varying operation, it is allowed to move integrally with the seventh lens $L_7$ and eighth lens $L_8$. Also, the reduction side of the present lens system is formed telecentric.

In Table 2, there are shown the values of the following items: that is, the radius of curvature R of the respective lens surfaces of the present projecting zoom lens; the on-axis surface spacings D; and, the refractive indexes N and Abbe numbers v on the d line of the respective lenses.

Here, in the lower stage of Table 2, there are shown the spacings between the respective lens groups at the wide angle end, at the middle point and at the tele end. Also, in the lower stage of Table 2, there are shown the aperture diameters (diaphragm diameters) of the aperture (variable diaphragm) 3 at the wide angle end, at the middle point and at the tele end. At the wide angle end, the spacing is 0.909, at the middle point, 1.264 and, at the tele end, 1.349, whereby, even in the power varying operation, the fastness (Fno.) is prevented from varying.

TABLE 2

F = 1.00~1.16~1.39 (F: Focus distance)

| Surface Number | R | D | $N_d$ | $v_d$ |
|---|---|---|---|---|
| 1 | 2.902 | 0.333 | 1.5182 | 58.9 |
| 2 | 1685.530 | 0.008 | | |
| 3 | 2.065 | 0.083 | 1.6204 | 60.3 |
| 4 | 1.137 | 0.240 | | |
| 5 | 3.288 | 0.072 | 1.6204 | 60.3 |
| 6 | 1.517 | 0.294 | | |
| 7 | −2.563 | 0.064 | 1.8081 | 22.8 |
| 8 | 2.580 | 0.420 | | |
| 9 | −3.618 | 0.069 | 1.5163 | 64.1 |
| 10 | 19.879 | 0.232 | 1.7552 | 27.5 |
| 11 | −2.143 | Movement 1 | | |
| 12 | 3.256 | 0.180 | 1.8061 | 33.3 |
| 13 | −9.325 | 0.008 | | |
| 14 | 1.560 | 0.064 | 1.4875 | 70.2 |
| 15 | 1.155 | 0.774 | | |
| 16 Variable Diaphragm | ∞ | Movement 2 | | |
| 17 | 20.847 | 0.098 | 1.8052 | 25.4 |
| 18 | 3.701 | 0.041 | | |
| 19 | 3.078 | 0.235 | 1.4970 | 81.5 |
| 20 | −1.783 | Movement 3 | | |
| 21 | 2.333 | 0.057 | 1.6968 | 55.5 |
| 22 | 1.447 | 0.265 | | |
| 23 | −1.105 | 0.057 | 1.8040 | 46.6 |
| 24 | 2.600 | 0.334 | 1.6180 | 63.3 |
| 25 | −1.539 | 0.008 | | |
| 26 | 5.410 | 0.351 | 1.4388 | 94.9 |
| 27 | −1.626 | Movement 4 | | |
| 28 | 2.325 | 0.257 | 1.4970 | 81.5 |
| 29 | −12.713 | 0.522 | | |
| 30 | ∞ | 2.641 | 1.5163 | 64.1 |
| 31 | ∞ | 0.113 | 1.4875 | 70.2 |
| 32 | ∞ | | | |

| (Movement Spacing) | Wide | Middle | Tele |
|---|---|---|---|
| Movement 1 | 1.178 | 0.751 | 0.326 |
| Movement 2 | 1.232 | 1.140 | 0.977 |
| Movement 3 | 0.015 | 0.335 | 0.875 |
| Movement 4 | 0.015 | 0.214 | 0.262 |
| Diaphragm Diameter | 0.909 | 1.264 | 1.349 |

According to the projecting zoom lens of the example 2, as shown in Table 8, the conditional expressions (2) and (3) are satisfied.

Figure 16:
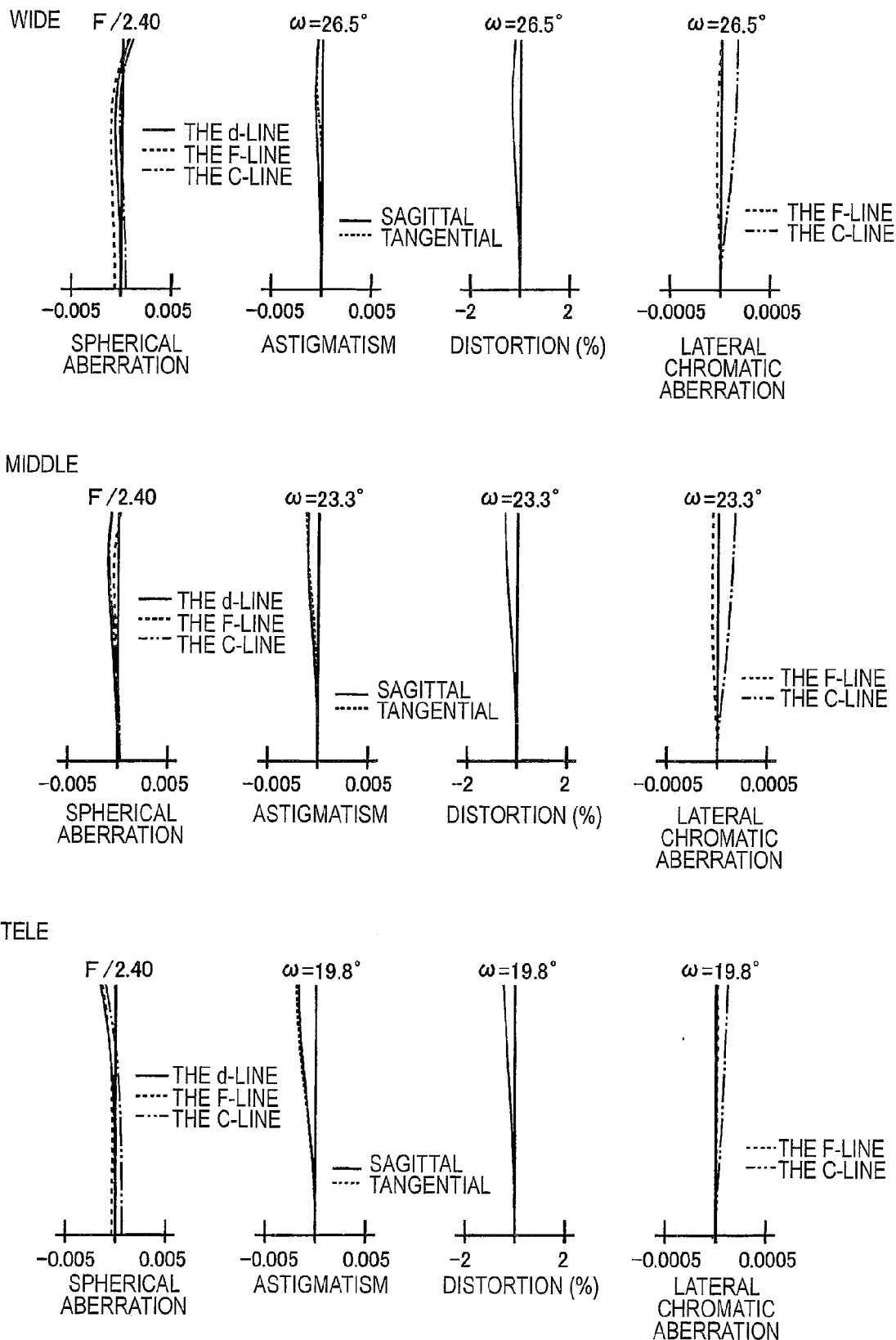
FIG. 16 shows the respective aberrations of the projecting zoom lens according to the example 2 at the wide angle end, middle position and tele end.

Also, FIG. 16 is an aberration view to show the spherical aberrations, astigmatisms, distortions and power chromatic aberrations of the projecting zoom lens according to the example 2 at the wide angle end, at the middle point and at the tele end.

As may be seen clearly from these aberration views, according to the projecting zoom lens of the example 2, the amount of variations in various aberrations including spherical aberrations and astigmatism caused when zooming the projecting zoom lens may be reduced down to a very small amount and also such various aberrations may be corrected quite properly.

Also, according to the projecting zoom lens of the example 2, the values of the fastness (Fno.) of the zoom lens at the wide angle end, at the middle point and at the tele end are all 2.40, while the amount of variations in the fastness (Fno.) which is caused by the lens zooming operation is substantially 0.

Example 3

Figure 5:
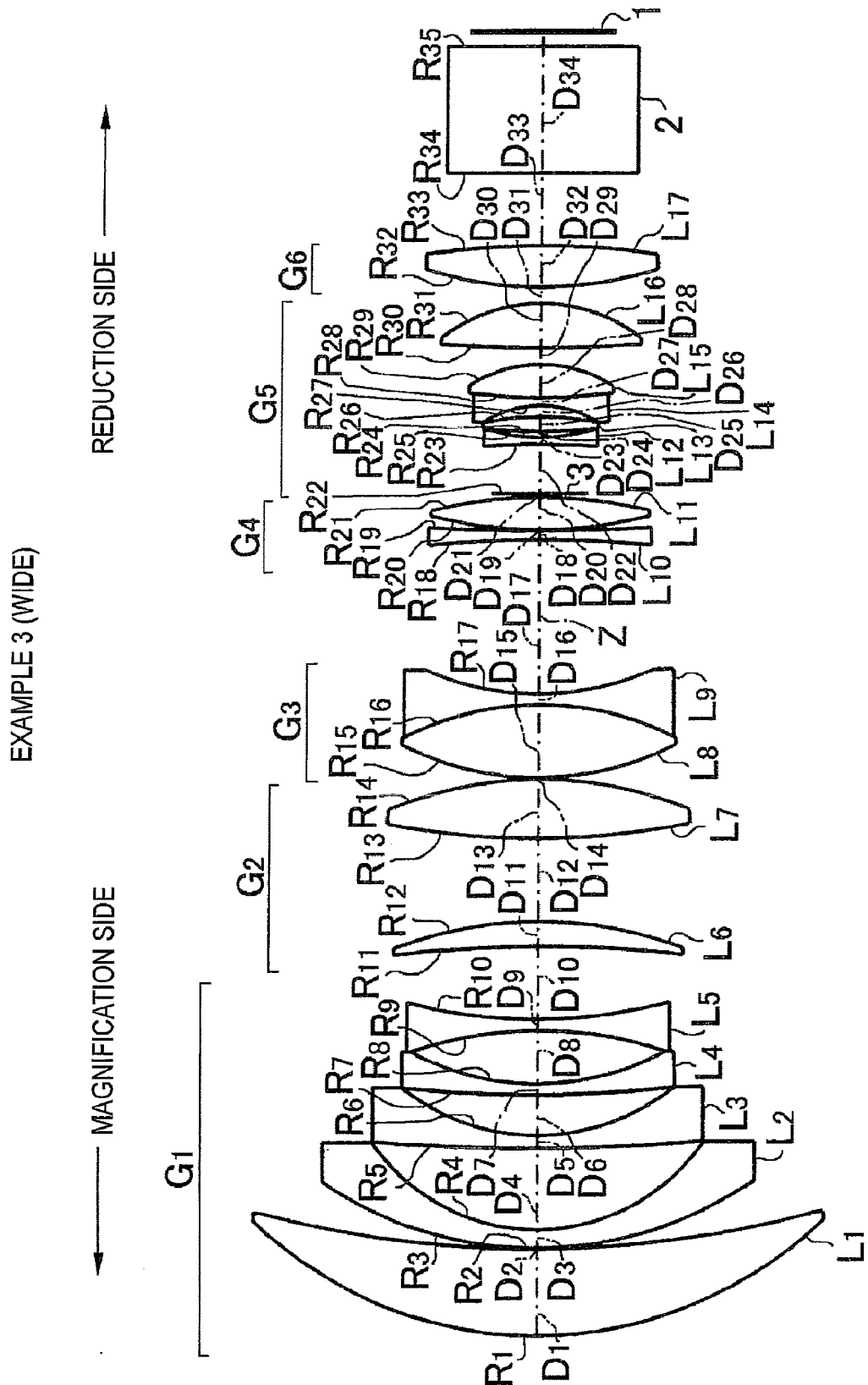
FIG. 5 is a lens structure view of a projecting zoom lens according to an example 3.

FIG. 5 shows a schematic structure of a projecting zoom lens according to an example 3. Basically, this projecting zoom lens, substantially similarly to the example 1, includes six lens groups. Specifically, the respective lens groups are structured in the following manner.

Firstly, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, a fourth lens $L_4$ made of a negative meniscus lens having a convex surface facing the magnification side, and a fifth lens $L_5$ made of a biconcave lens. And, the second lens group $G_2$ includes, sequentially from the magnification side, a sixth lens $L_6$ made of a positive meniscus lens having a convex surface facing the reduction side and a seventh lens $L_7$ made of a biconvex lens.

Also, the third lens group $G_3$ is made of a cemented lens which includes, sequentially from the magnification side, an eighth lens $L_8$ made of a biconvex lens and a ninth lens $L_9$ made of a biconcave lens, while the eighth and ninth lenses are connected together. Also, the fourth lens groups $G_4$ includes, sequentially from the magnification side, a tenth lens $L_{10}$ made of a biconcave lens and an eleventh lens $L_{11}$ made of a biconvex lens.

Also, the fifth lens group $G_5$ includes, sequentially from the magnification side, a twelfth lens $L_{12}$ made of a biconcave lens, a thirteenth lens $L_{13}$ made of a biconvex lens, a fourteenth lens $L_{14}$ made of a biconcave lens, a fifteenth lens $L_{15}$ made of a biconvex lens and a sixteenth lens $L_{16}$ made of a biconvex lens, while the fourteenth lens $L_{14}$ and fifteenth lens $L_{15}$ are connected together to form a cemented lens. Further, the sixth lens group $G_6$ includes only a seventeenth lens $L_{17}$ made of a biconvex lens.

Figure 6:
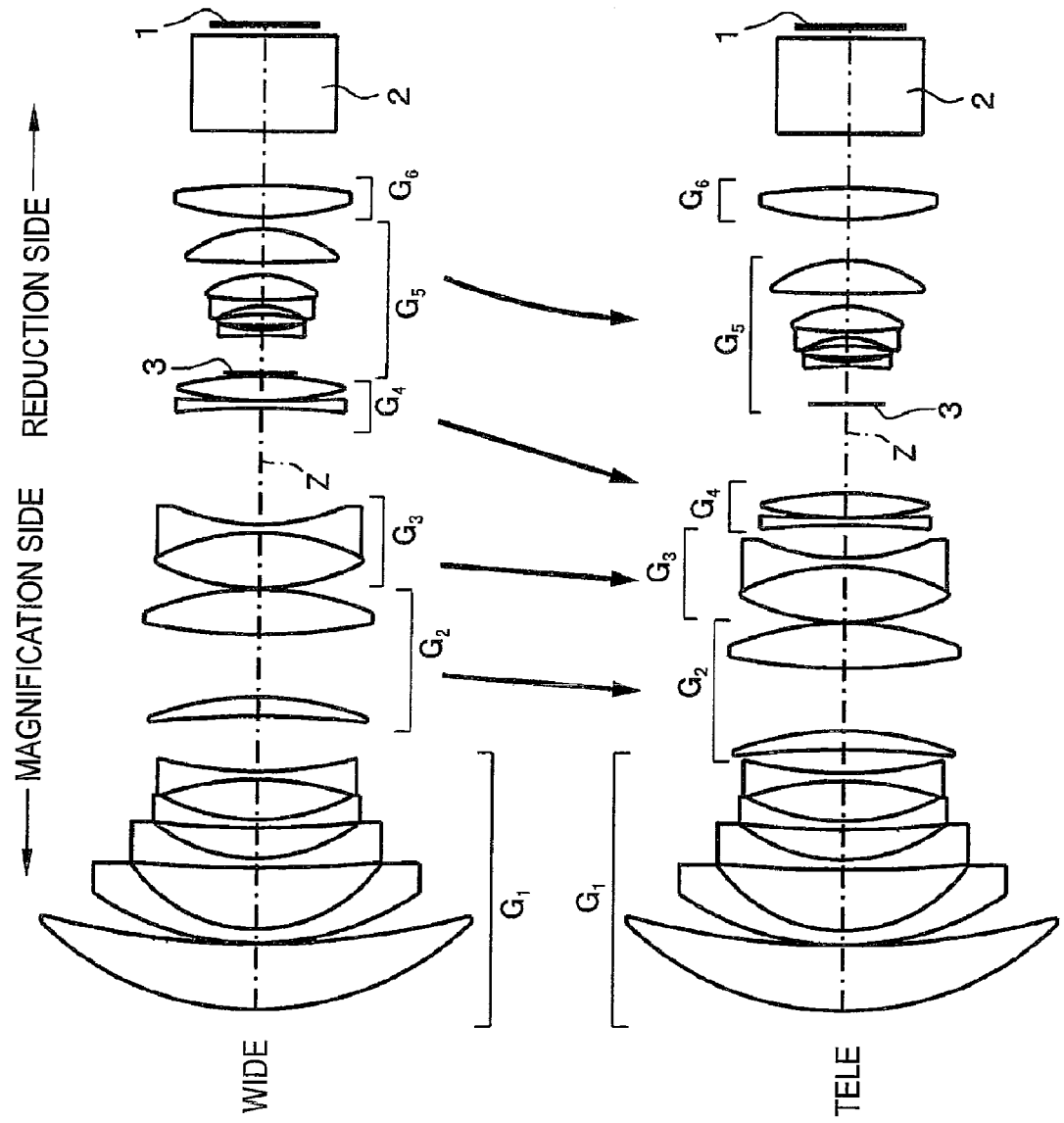
FIG. 6 is a view to show the moving positions of the respective lens groups of the projecting zoom lens according to the example 3 at the wide angle end and tele end thereof.

FIG. 6 shows the moving positions of the respective lens groups of the projecting zoom lens according to the example 3 at the wide angle end, at the middle point and at the tele end. As shown in FIG. 6, in the power varying operation, the first lens group $G_1$ and sixth lens group $G_6$ are used as fixed lens groups, while the second lens group to fifth lens groups $G_2$ to $G_5$ are used as moving lens groups.

Also, the aperture (variable diaphragm) 3 is disposed in the fifth lens group $G_5$ and is structured such that, in the power varying operation, it is allowed to move integrally with the eleventh to sixteenth lenses $L_{12}$ to $L_{16}$. Also, the reduction side of the present lens system is formed telecentric.

In Table 3, there are shown the values of the following items: that is, the radius of curvature R of the respective lens surfaces of the present projecting zoom lens; the on-axis surface spacings D of the respective lenses; and, the refractive indexes N and Abbe numbers v on the d line of the respective lenses.

Here, in the lower stage of Table 3, there are shown the spacings between the respective lens groups at the wide angle end, at the middle point and at the tele end. Also, in the lower stage of Table 3, there are shown the aperture diameters (diaphragm diameters) of the aperture (variable diaphragm) 3 at the wide angle end, at the middle point and at the tele end. At the wide angle end, the diameter is 1.005, at the middle point, 1.018 and, at the tele end, 1.057, whereby, even in the power varying operation, the fastness (Fno.) is prevented from varying.

TABLE 3

F = 1.00~1.10~1.33 (F: Focus distance)

| Surface Number | R | D | $N_d$ | $v_d$ |
|---|---|---|---|---|
| 1 | 4.210 | 0.900 | 1.7550 | 52.3 |
| 2 | 11.142 | 0.008 | | |

TABLE 3-continued

F = 1.00~1.10~1.33 (F: Focus distance)

| | | | | |
|---|---|---|---|---|
| 3 | 3.955 | 0.191 | 1.6180 | 63.3 |
| 4 | 2.082 | 0.835 | | |
| 5 | 20.048 | 0.133 | 1.8052 | 25.4 |
| 6 | 2.238 | 0.418 | | |
| 7 | 12.268 | 0.114 | 1.7292 | 54.7 |
| 8 | 2.791 | 0.548 | | |
| 9 | −4.099 | 0.114 | 1.4970 | 81.5 |
| 10 | 5.291 | Movement 1 | | |
| 11 | −13.127 | 0.260 | 1.8340 | 37.2 |
| 12 | −4.194 | 0.861 | | |
| 13 | 7.963 | 0.617 | 1.6056 | 43.7 |
| 14 | −4.030 | Movement 2 | | |
| 15 | 3.087 | 0.756 | 1.8052 | 25.4 |
| 16 | −3.085 | 0.114 | 1.8467 | 23.8 |
| 17 | 2.870 | Movement 3 | | |
| 18 | −11.742 | 0.095 | 1.5174 | 52.4 |
| 19 | 22.577 | 0.008 | | |
| 20 | 4.556 | 0.336 | 1.6180 | 63.3 |
| 21 | −4.836 | Movement 4 | | |
| 22 Variable Diaphragm | ∞ | 0.515 | | |
| 23 | −7.361 | 0.069 | 1.5955 | 39.2 |
| 24 | 1.894 | 0.061 | | |
| 25 | 4.988 | 0.155 | 1.7292 | 54.7 |
| 26 | −2.956 | 0.113 | | |
| 27 | −1.131 | 0.084 | 1.8061 | 33.3 |
| 28 | 5.907 | 0.342 | 1.4388 | 94.9 |
| 29 | −1.373 | 0.171 | | |
| 30 | 14.505 | 0.460 | 1.4970 | 81.5 |
| 31 | −1.684 | Movement 5 | | |
| 32 | 3.976 | 0.428 | 1.8040 | 46.6 |
| 33 | −8.325 | 0.883 | | |
| 34 | ∞ | 1.309 | 1.5163 | 64.1 |
| 35 | ∞ | | | |

| (Movement Spacing) | Wide | Middle | Tele |
|---|---|---|---|
| Movement 1 | 0.754 | 0.576 | 0.317 |
| Movement 2 | 0.018 | 0.281 | 0.018 |
| Movement 3 | 1.603 | 0.986 | 0.453 |
| Movement 4 | 0.041 | 0.470 | 1.231 |
| Movement 5 | 0.171 | 0.274 | 0.568 |
| Diaphragm Diameter | 1.005 | 1.018 | 1.057 |

According to the projecting zoom lens of the example 3, as shown in Table 8, the conditional expressions (2) and (3) are satisfied.

Also, FIG. 17 is an aberration view to show the spherical aberrations, astigmatisms, distortions and power chromatic aberrations of the projecting zoom lens according to the example 3 at the wide angle end, at the middle point and at the tele end.

As may be seen clearly from these aberration views, according to the projecting zoom lens of the example 3, the amount of variations in various aberrations including spherical aberrations and astigmatism respectively caused when zooming the projecting zoom lens may be reduced down to a very small amount and also such various aberrations may be corrected quite properly.

Also, according to the projecting zoom lens of the example 3, the values of the fastness (Fno.) of the zoom lens at the wide angle end, at the middle point and at the tele end are all 2.00, while the amount of variations in the fastness (Fno.) which are caused by the lens zooming operation is substantially 0.

Example 4

Figure 7:
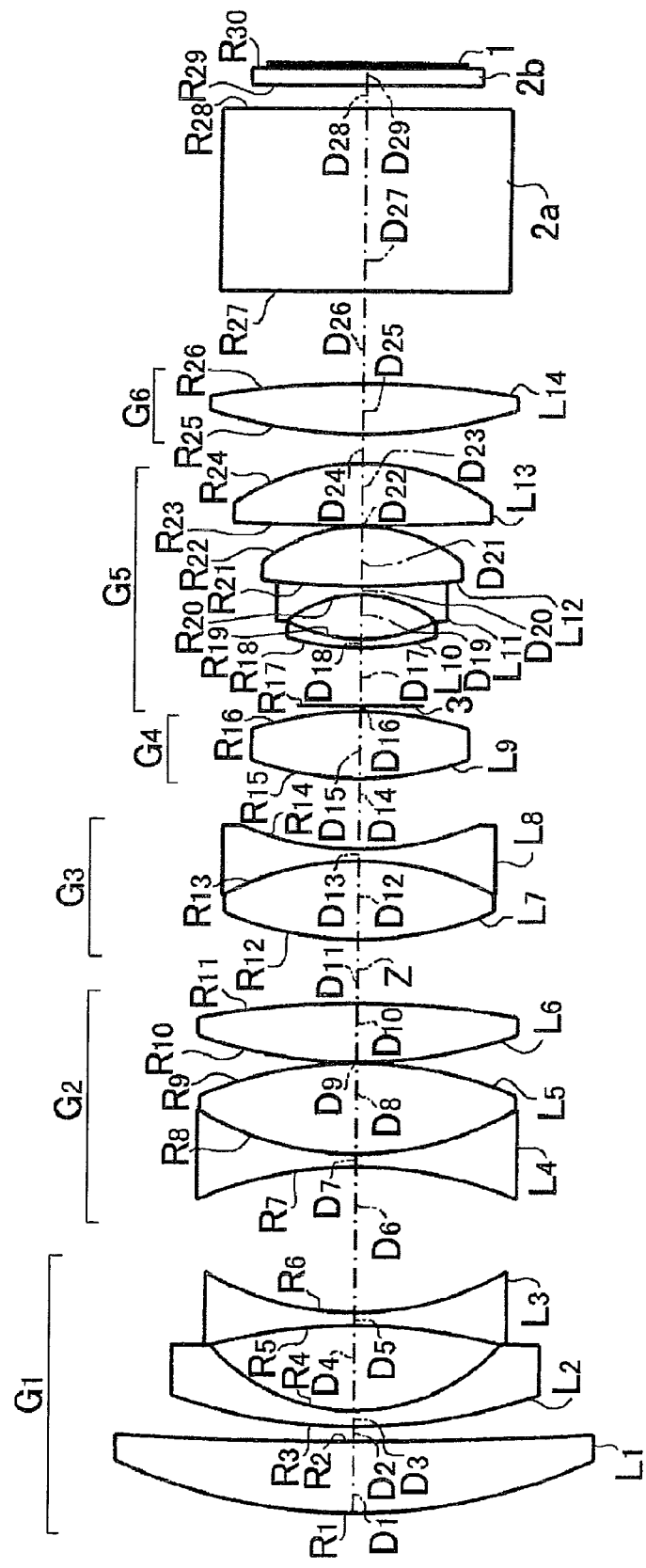
FIG. 7 is a lens structure view of a projecting zoom lens according to an example 4.

FIG. 7 shows a schematic structure of a projecting zoom lens according to an example 4. Basically, this projecting zoom lens, substantially similarly to the example 1, includes six lens groups. Specifically, the respective lens groups are structured in the following manner.

That is, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side and a third lens $L_3$ made of a biconcave lens.

Also, the second lens group $G_2$ includes, sequentially from the magnification side, a fourth lens $L_4$ made of a biconcave lens, a fifth lens $L_5$ made of a biconvex lens and a sixth lens $L_6$ made of a biconvex lens, while the fourth lens $L_4$ and fifth lens $L_5$ are connected together to form a cemented lens. Also, the third lens group $G_3$ includes, sequentially from the magnification side, a seventh lens $L_7$ made of a biconvex lens and an eighth lens $L_8$ made of a biconcave lens, while these two lenses are connected together to form a cemented lens.

Also, the fourth lens group $G_4$ includes only a ninth lens $L_9$ made of a biconvex lens. And, the fifth lens group $G_5$ includes, sequentially from the magnification side, a tenth lens $L_{10}$ made of a negative meniscus lens having a convex surface facing the magnification side, a cemented lens structured such that an eleventh lens $L_{11}$ made of a biconcave lens a twelfth lens $L_{12}$ made of biconvex lens are connected together, and a thirteenth lens $L_{13}$ made of a biconvex lens. Further, the sixth lens group $G_6$ includes only a fourteenth lens $L_{14}$ made of a biconvex lens.

Figure 8:
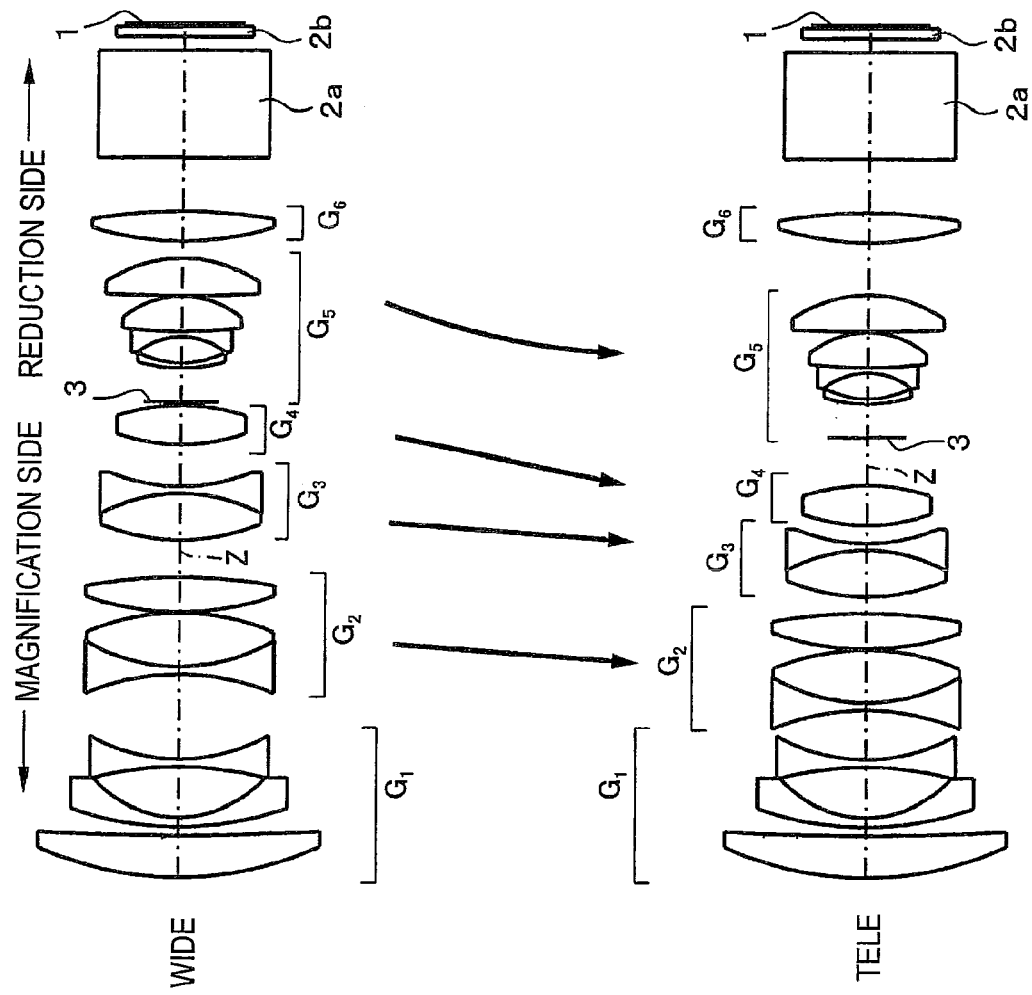
FIG. 8 is a view to show the moving positions of the respective lens groups of the projecting zoom lens according to the example 4 at the wide angle end and tele end thereof.

FIG. 8 shows the moving positions of the respective lens groups of a projecting zoom lens according to an example 4 at the wide angle end, at the middle point, and at the tele end. As shown in FIG. 8, in the power varying operation, the first lens group $G_1$ and sixth lens group $G_6$ are used as fixed lens groups, while the second to fifth lens groups $G_2$ to $G_5$ are used as moving lens groups.

Also, the aperture (variable diaphragm) 3 is disposed in the fifth lens group $G_5$ and is structured such that, in the power varying operation, it is allowed to move integrally with the tenth to thirteenth lenses $L_{10}$ to $L_{13}$. Also, the reduction side of the present lens system is formed telecentric.

In Table 4, there are shown the values of the following items: that is, the radius of curvature R of the respective lens surfaces of the present projecting zoom lens; the on-axis surface spacings D of the respective lenses; and, the refraction indexes N and Abbe numbers ν on the d line of the respective lenses.

Here, in the lower stage of Table 4, there are shown the spacings between the respective lens groups at the wide angle end, at the middle point and at the tele end. Also, in the lower stage of Table 4, there are shown the aperture diameters (diaphragm diameters) of the aperture (variable diaphragm) 3 at the wide angle end, at the middle point and at the tele end. At the wide angle end, the spacing is 0.342, at the middle point, 0.349 and, at the tele end, 0.361, whereby, even in the power varying operation, the fastness (Fno.) is prevented from varying.

TABLE 4

F = 1.00~1.10~1.33 (F: Focus distance)

| Surface Number | R | D | $N_d$ | $v_d$ |
|---|---|---|---|---|
| 1 | 3.076 | 0.382 | 1.7130 | 53.9 |
| 2 | 21.403 | 0.078 | | |
| 3 | 2.927 | 0.086 | 1.5891 | 61.1 |
| 4 | 1.035 | 0.457 | | |
| 5 | −3.109 | 0.070 | 1.7432 | 49.3 |
| 6 | 1.615 | Movement 1 | | |
| 7 | −2.215 | 0.070 | 1.8052 | 25.4 |
| 8 | 1.673 | 0.484 | 1.8061 | 40.9 |

TABLE 4-continued

F = 1.00~1.10~1.33 (F: Focus distance)

| | | | | |
|---|---|---|---|---|
| 9 | −2.168 | 0.007 | | |
| 10 | 2.582 | 0.319 | 1.8052 | 25.4 |
| 11 | −5.074 | Movement 2 | | |
| 12 | 1.873 | 0.427 | 1.5163 | 64.1 |
| 13 | −1.533 | 0.063 | 1.7432 | 49.3 |
| 14 | 1.659 | Movement 3 | | |
| 15 | 1.727 | 0.363 | 1.4970 | 81.5 |
| 16 | −1.858 | Movement 4 | | |
| 17 Variable Diaphragm | ∞ | 0.313 | | |
| 18 | 1.418 | 0.047 | 1.5163 | 64.1 |
| 19 | 0.864 | 0.241 | | |
| 20 | −0.637 | 0.047 | 1.8061 | 33.3 |
| 21 | 4.541 | 0.322 | 1.4970 | 81.5 |
| 22 | −0.852 | 0.006 | | |
| 23 | 13.758 | 0.337 | 1.4970 | 81.5 |
| 24 | −1.222 | Movement 5 | | |
| 25 | 2.737 | 0.273 | 1.7130 | 53.9 |
| 26 | −4.776 | 0.493 | | |
| 27 | ∞ | 0.980 | 1.5163 | 64.1 |
| 28 | ∞ | 0.141 | | |
| 29 | ∞ | 0.094 | 1.4875 | 70.2 |
| 30 | ∞ | | | |

| (Movement Spacing) | Wide | Middle | Tele |
|---|---|---|---|
| Movement 1 | 0.781 | 0.659 | 0.455 |
| Movement 2 | 0.345 | 0.307 | 0.156 |
| Movement 3 | 0.381 | 0.298 | 0.167 |
| Movement 4 | 0.031 | 0.148 | 0.436 |
| Movement 5 | 0.156 | 0.280 | 0.475 |
| Diaphragm Diameter | 0.342 | 0.349 | 0.361 |

According to the projecting zoom lens of the example 4, as shown in Table 8, the conditional expressions (2) and (3) are satisfied.

Figure 18:
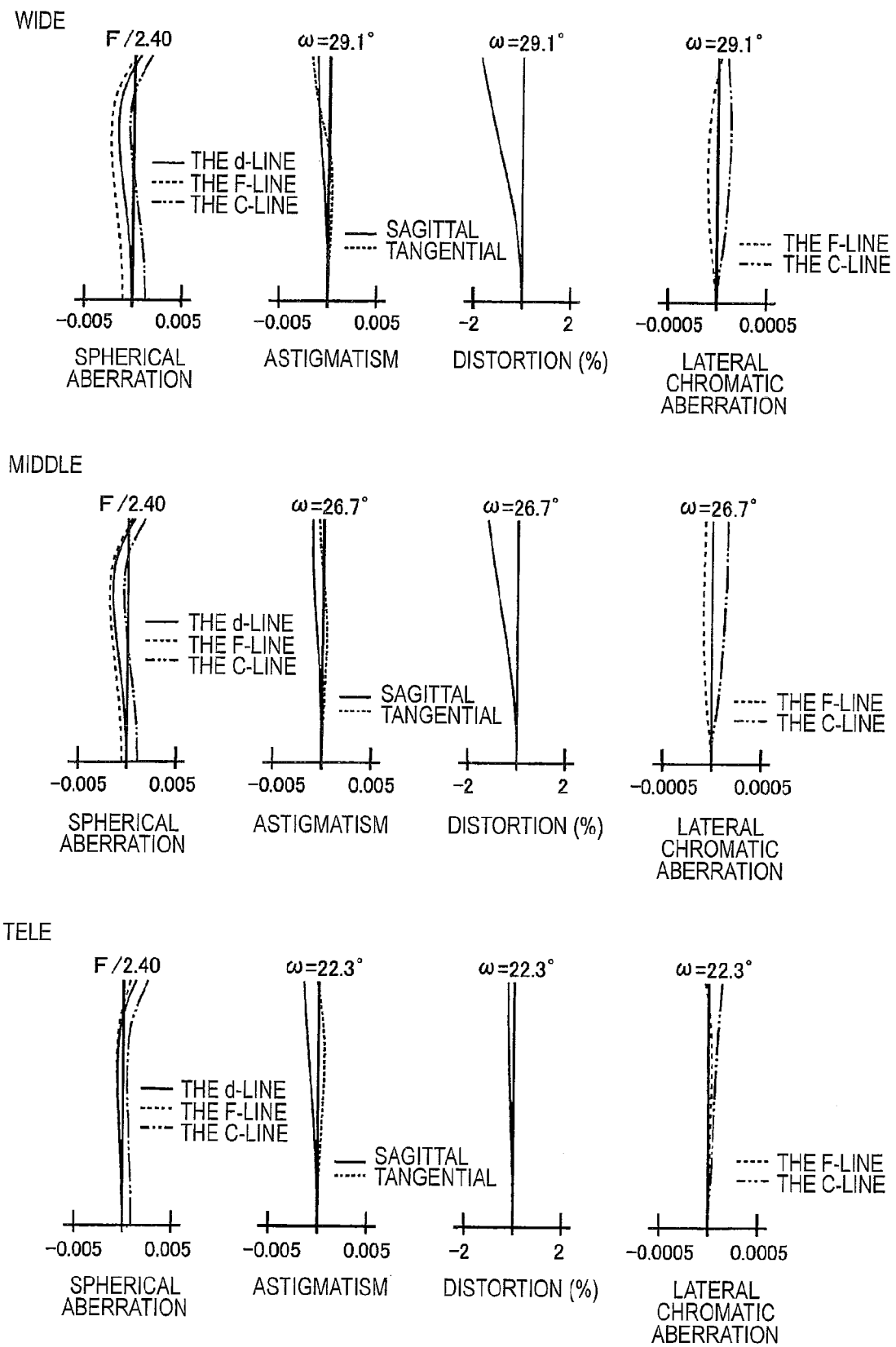
FIG. 18 shows the respective aberrations of the projecting zoom lens according to the example 4 at the wide angle end, middle position and tele end.

Also, FIG. 18 is an aberration view to show the spherical aberrations, astigmatism, distortions and power chromatic aberrations of the projecting zoom lens according to the example 4 at the wide angle end, at the middle point and at the tele end.

As may be seen clearly from these aberration views, according to the projecting zoom lens of the example 4, the amount of variations in various aberrations including spherical aberrations and astigmatism caused when zooming the projecting zoom lens may be reduced down to a very small amount and also such various aberrations may be corrected quite properly.

Also, according to the projecting zoom lens of the example 4, the values of the fastness (Fno.) of the zoom lens at the wide angle end, at the middle point and at the tele end are all 2.40, while the amount of variations in the fastness (Fno.) which are caused by the zooming operation of the present zoom lens is substantially 0.

Example 5

Figure 9:
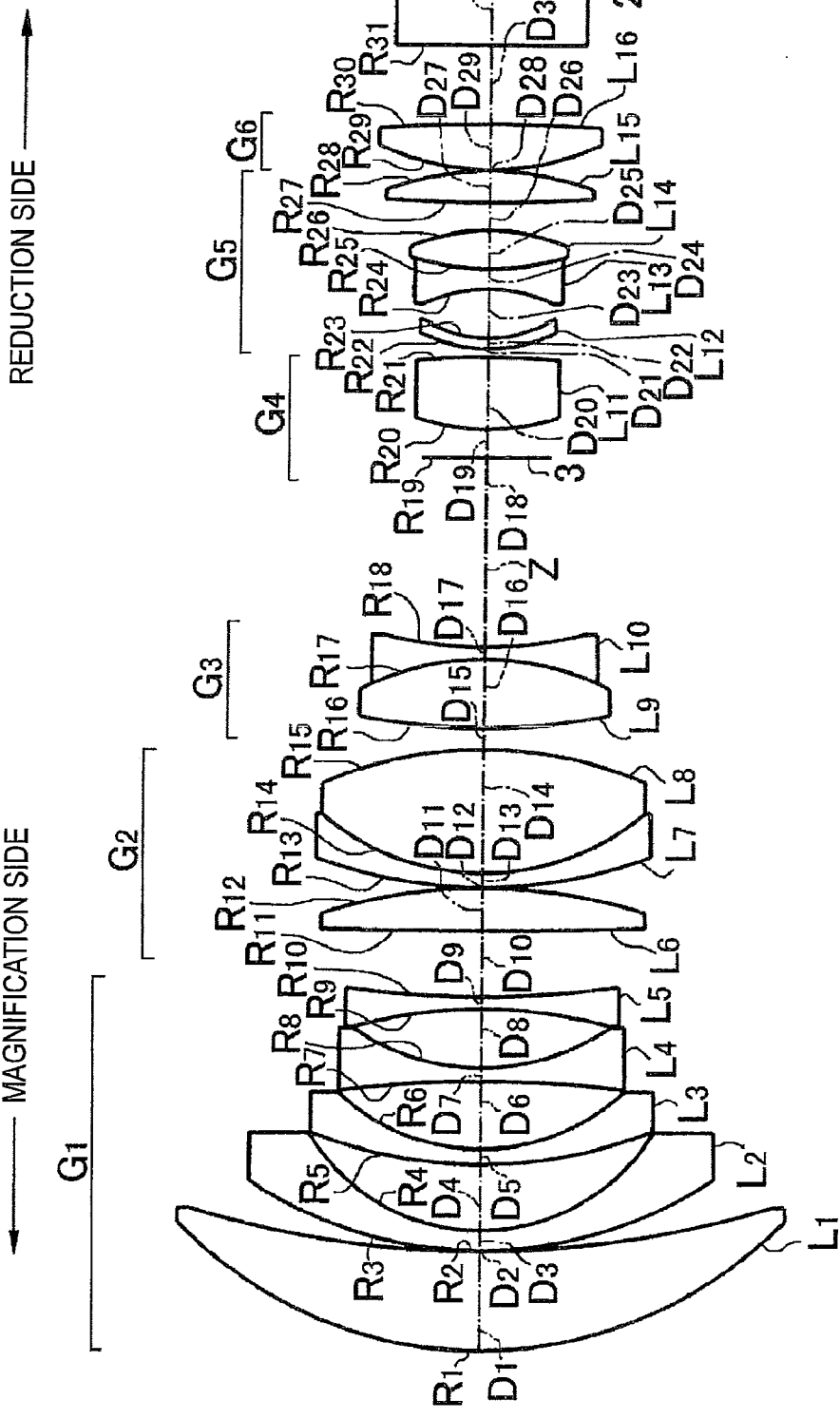
FIG. 9 is a lens structure view of a projecting zoom lens according to an example 5.

FIG. 9 shows a schematic structure of a projecting zoom lens according to an example 5. Basically, this projecting zoom lens, substantially similarly to the example 1, includes six lens groups. Specifically, the respective lens groups are structured in the following manner.

Firstly, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, a fourth lens $L_4$ made of a biconcave lens, and a fifth lens $L_5$ made of a biconcave lens. And, the second lens group $G_2$ includes, sequentially from the magnification side, a sixth lens $L_6$ made of a biconvex lens, a seventh lens $L_7$ made of a negative meniscus lens having a convex surface facing the magnification side, and an eighth lens $L_8$ made of a biconvex lens, while the seventh lens $L_7$ and eighth lens $L_8$ are connected together to form a cemented lens.

Also, the third lens group $G_3$ is made of a cemented lens which includes, sequentially from the magnification side, a ninth lens $L_9$ made of a biconvex lens and a tenth lens $L_{10}$ made of a biconcave lens, while the ninth and tenth lenses are connected together. Also, the fourth lens groups $G_4$ includes only an eleventh lens $L_{11}$ made of a biconvex lens.

Also, the fifth lens group $G_5$ includes, sequentially from the magnification side, a twelfth lens $L_{12}$ made of a negative meniscus lens having a convex surface facing the magnification side, a thirteenth lens $L_{13}$ made of a biconcave lens, a fourteenth lens $L_{14}$ made of a biconvex lens, and a fifteenth lens $L_{15}$ made of a biconvex lens, while the thirteenth lens $L_{13}$ and fourteenth lens $L_{14}$ are connected together to form a cemented lens. Further, the sixth lens group $G_6$ includes only a sixteenth lens $L_{16}$ made of a biconvex lens.

Figure 10:
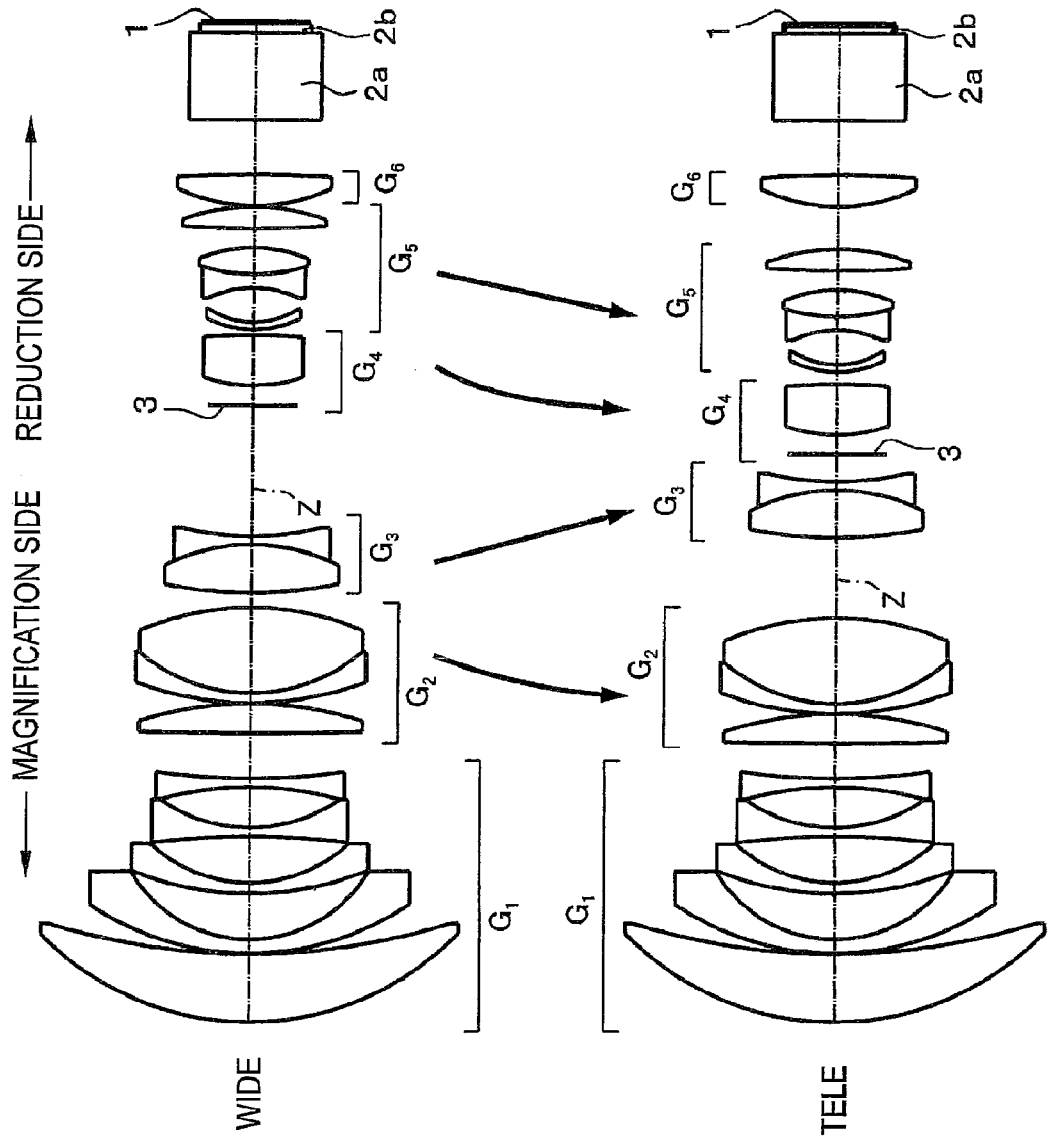
FIG. 10 is a view to show the moving positions of the respective lens groups of the projecting zoom lens according to the example 5 at the wide angle end and tele end thereof.

FIG. 10 shows the moving positions of the respective lens groups of the projecting zoom lens according to the example 5 at the wide angle end, at the middle point and at the tele end. As shown in FIG. 10, in the power varying operation, the first lens group $G_1$ and sixth lens group $G_6$ are used as fixed lens groups, while the second lens group $G_2$ to fifth lens groups $G_2$ to $G_5$ are used as moving lens groups.

Also, the aperture (variable diaphragm) 3 is disposed in the fourth lens group $G_4$ and is structured such that, in the power varying operation, it is allowed to move integrally with the eleventh lens $L_{11}$. Also, the reduction side of the present lens system is formed telecentric.

In Table 5, there are shown the values of the following items: that is, the radius of curvature R of the respective lens surfaces of the present projecting zoom lens; the on-axis surface spacings D of the respective lenses; and, the refraction indexes N and Abbe numbers ν on the d line of the respective lenses.

Here, in the lower stage of Table 5, there are shown the aperture diameters (diaphragm diameters) of the aperture (variable diaphragm) 3 at the wide angle end, at the middle point and at the tele end. At the wide angle end, the diameter is 1.005, at the middle point, 1.018 and, at the tele end, 1.057, whereby, even in the power varying operation, the fastness (Fno.) is prevented from varying.

TABLE 5

F = 1.00~1.10~1.33 (F: Focus distance)

| Surface Number | R | D | $N_d$ | $ν_d$ |
|---|---|---|---|---|
| 1 | 4.034 | 0.949 | 1.8040 | 46.6 |
| 2 | 9.431 | 0.008 | | |
| 3 | 3.997 | 0.193 | 1.7130 | 53.9 |
| 4 | 1.932 | 0.636 | | |
| 5 | 4.455 | 0.147 | 1.7130 | 53.9 |
| 6 | 2.012 | 0.648 | | |
| 7 | −10.955 | 0.128 | 1.8052 | 25.4 |
| 8 | 2.186 | 0.567 | | |
| 9 | −4.684 | 0.116 | 1.4970 | 81.5 |
| 10 | 9.227 | Movement 1 | | |
| 11 | 52.857 | 0.409 | 1.8052 | 25.4 |
| 12 | −5.153 | 0.008 | | |
| 13 | 4.611 | 0.135 | 1.8052 | 25.4 |
| 14 | 2.380 | 1.196 | 1.6935 | 53.2 |
| 15 | −3.935 | Movement 2 | | |
| 16 | 6.169 | 0.668 | 1.6034 | 38.0 |

TABLE 5-continued

F = 1.00~1.10~1.33 (F: Focus distance)

| | | | | |
|---|---|---|---|---|
| 17 | −2.662 | 0.116 | 1.8040 | 46.6 |
| 18 | 3.950 | Movement 3 | | |
| 19 Variable Diaphragm | ∞ | 0.271 | | |
| 20 | 2.101 | 0.696 | 1.7234 | 38.0 |
| 21 | −9.739 | Movement 4 | | |
| 22 | 1.469 | 0.098 | 1.6034 | 38.0 |
| 23 | 1.144 | 0.480 | | |
| 24 | −1.460 | 0.190 | 1.8052 | 25.4 |
| 25 | 2.537 | 0.371 | 1.4970 | 81.5 |
| 26 | −1.935 | 0.271 | | |
| 27 | 15.340 | 0.299 | 1.6204 | 60.3 |
| 28 | −2.858 | Movement 5 | | |
| 29 | 2.498 | 0.440 | 1.6204 | 60.3 |
| 30 | −15.538 | 0.775 | | |
| 31 | ∞ | 1.211 | 1.5163 | 64.1 |
| 32 | ∞ | 0.116 | 1.4875 | 70.2 |
| 33 | ∞ | | | |

| (Movement Spacing) | Wide | Middle | Tele |
|---|---|---|---|
| Movement 1 | 0.632 | 0.564 | 0.486 |
| Movement 2 | 0.205 | 0.516 | 1.118 |
| Movement 3 | 1.827 | 1.349 | 0.386 |
| Movement 4 | 0.085 | 0.116 | 0.176 |
| Movement 5 | 0.012 | 0.215 | 0.595 |
| Diaphragm Diameter | 1.250 | 1.296 | 1.382 |

According to the projecting zoom lens of the example 5, as shown in Table 8, the conditional expressions (1) to (6) are all satisfied.

Also, FIG. 19 is an aberration view to show the spherical aberrations, astigmatism, distortions and power chromatic aberrations of the projecting zoom lens according to the example 5 at the wide angle end, at the middle point and at the tele end.

As may be seen clearly from these aberration views, according to the projecting zoom lens of the example 4, the amount of variations in various aberrations including spherical aberrations and astigmatism caused when zooming the projecting zoom lens may be reduced down to a very small amount and also such various aberrations may be corrected quite properly.

Also, according to the projecting zoom lens of the example 5, the values of the fastness (Fno.) of the zoom lens at the wide angle end, at the middle point and at the tele end are all 2.00, while the amount of variations in the luminance (Fno.) caused by the zooming operation of the present zoom lens is substantially 0.

Example 6

Figure 11:
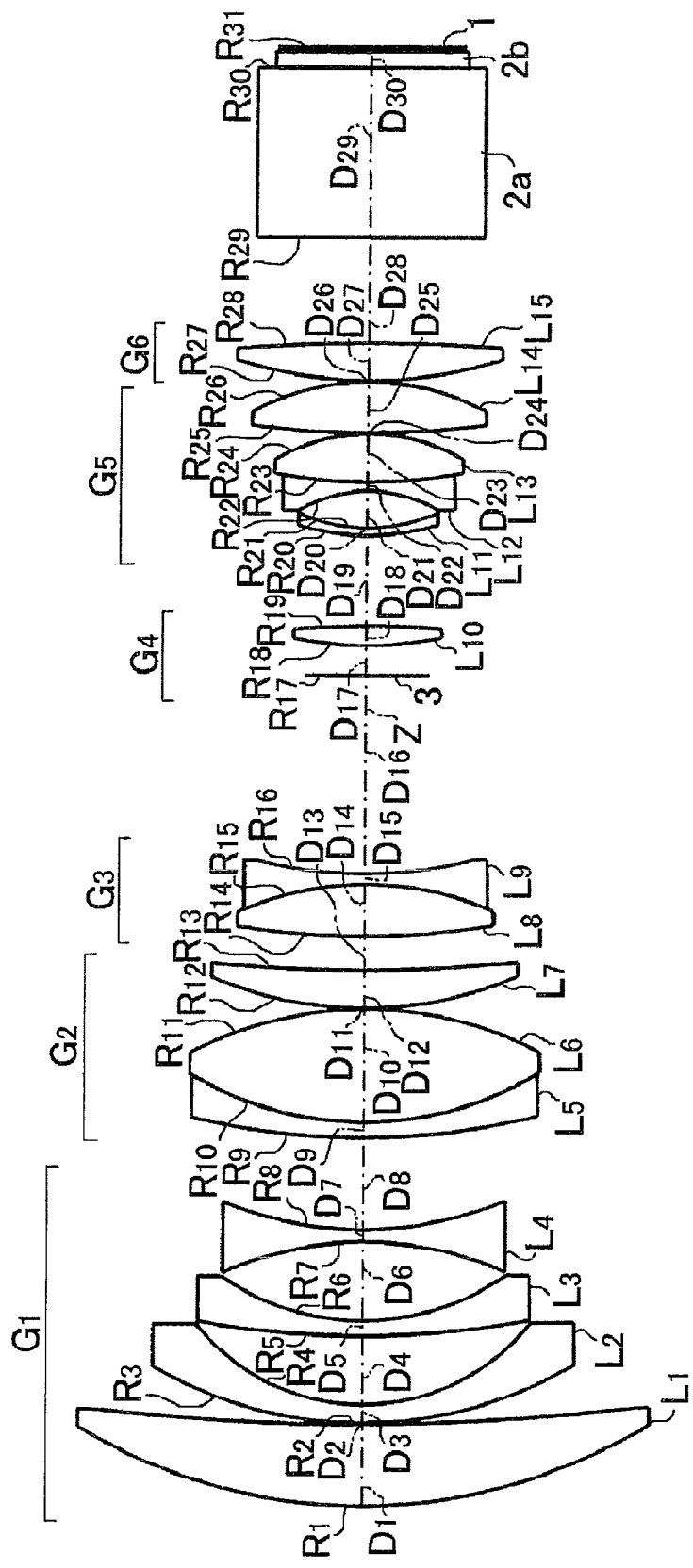
FIG. 11 is a lens structure view of a projecting zoom lens according to an example 6.

FIG. 11 shows a schematic structure of a projecting zoom lens according to an example 6. Basically, this projecting zoom lens, substantially similarly to the example 1, includes six lens groups. Specifically, the respective lens groups are structured in the following manner.

Firstly, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, and a fourth lens $L_4$ made of a biconcave lens. And, the second lens group $G_2$ includes, sequentially from the magnification side, a fifth lens $L_5$ made of a negative meniscus lens having a convex surface facing the magnification side, a sixth lens $L_6$ made of a biconvex lens, and a seventh lens $L_7$ made of a positive meniscus lens having a convex surface facing the magnification side, while the fifth lens $L_5$ and sixth lens $L_6$ are connected together to form a cemented lens.

Also, the third lens group $G_3$ includes, sequentially from the magnification side, an eighth lens $L_8$ made of a biconvex lens and a ninth lens $L_9$ made of a biconcave lens, while the eighth and ninth lenses $L_8$ and $L_9$ are connected together to form a cemented lens.

Also, the fourth lens groups $G_4$ includes only a tenth lens $L_{10}$ made of a biconvex lens. And, the fifth lens group $G_5$ includes, sequentially from the magnification side, an eleventh lens $L_{11}$ made of a negative meniscus lens having a convex surface facing the magnification side, a twelfth lens $L_{12}$ made of a biconcave lens, a thirteenth lens $L_{13}$ made of a biconvex lens, and a fourteenth lens $L_{14}$ made of a biconvex lens, while the twelfth lens $L_{12}$ and thirteenth lens $L_{13}$ are connected together to form a cemented lens. Further, the sixth lens group $G_6$ includes only a fifteenth lens $L_{15}$ made of a biconvex lens.

Figure 12:
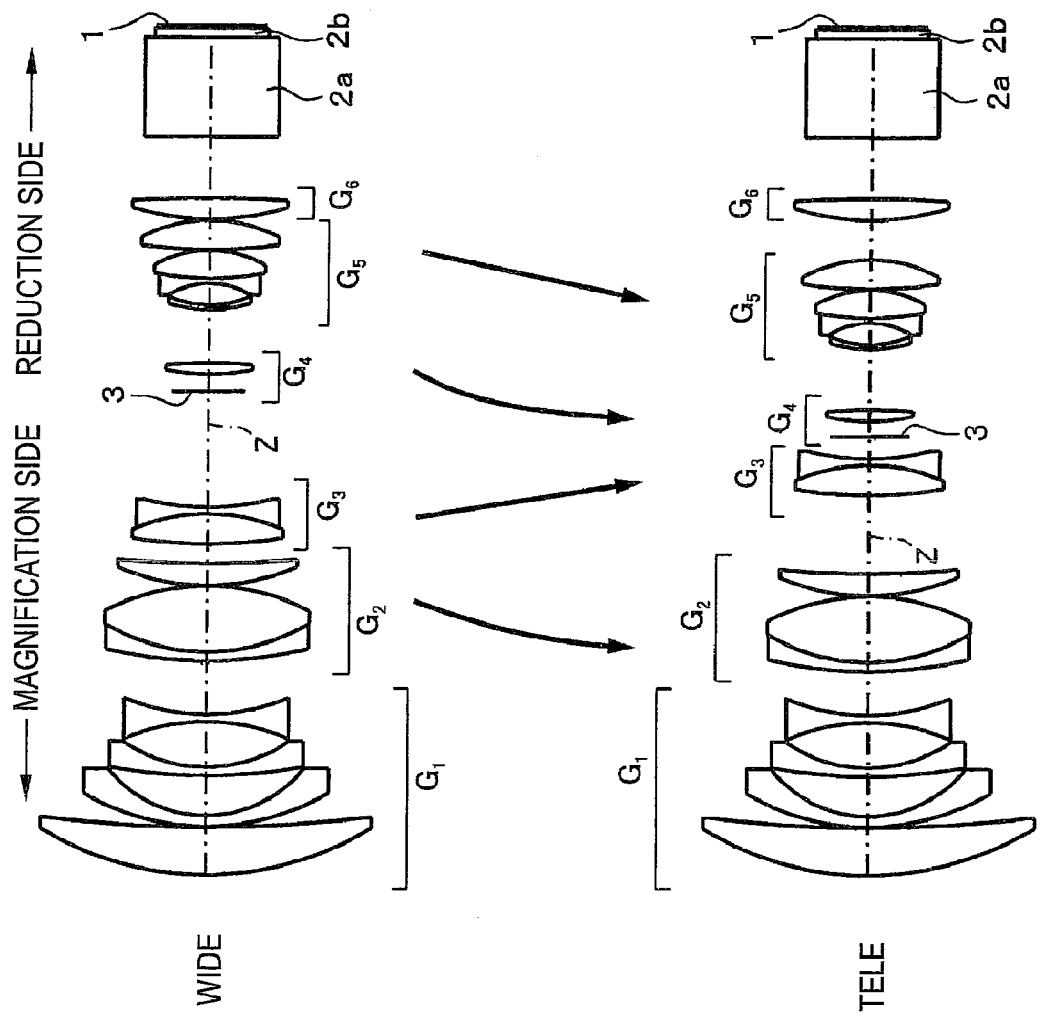
FIG. 12 is a view to show the moving positions of the respective lens groups of the projecting zoom lens according to the example 6 at the wide angle end and tele end thereof.

FIG. 12 shows the moving positions of the respective lens groups of the projecting zoom lens according to the example 6 at the wide angle end, at the middle point and at the tele end. As shown in FIG. 12, in the power varying operation, the first lens group $G_1$ and sixth lens group $G_6$ are used as fixed lens groups, while the second lens group $G_2$ to fifth lens group $G_5$ are used as moving lens groups.

Also, the aperture (variable diaphragm) 3 is disposed in the fourth lens group $G_4$ and is structured such that, in the power varying operation, it is allowed to move integrally with the tenth lens $L_{10}$. Also, the reduction side of the present lens system is formed telecentric.

In Table 6, there are shown the values of the following items: that is, the radius of curvature R of the respective lens surfaces of the present projecting zoom lens; the on-axis surface spacings D of the respective lenses; and, the refraction indexes N and Abbe numbers v on the d line of the respective lenses.

Here, in the lower stage of Table 6, there are shown spacings between the respective lenses at the wide angle end, at the middle point, and at the tele end. Also, in the lower stage of Table 6, there are shown the aperture diameters (diaphragm diameters) of the aperture (variable diaphragm) 3 at the wide angle end, at the middle point and at the tele end. At the wide angle end, the diameter is 0.895, at the middle point, 0.928 and, at the tele end, 0.980, whereby, even in the power varying operation, the fastness (Fno.) is prevented from varying.

TABLE 6

F = 1.00~1.10~1.33 (F: Focus distance)

| Surface Number | R | D | $N_d$ | $v_d$ |
|---|---|---|---|---|
| 1 | 3.904 | 0.583 | 1.6968 | 55.5 |
| 2 | 16.513 | 0.008 | | |
| 3 | 2.955 | 0.132 | 1.7130 | 53.9 |
| 4 | 1.526 | 0.492 | | |
| 5 | 6.609 | 0.109 | 1.7130 | 53.9 |
| 6 | 1.772 | 0.562 | | |
| 7 | −2.502 | 0.089 | 1.7440 | 44.8 |
| 8 | 2.619 | Movement 1 | | |
| 9 | 5.262 | 0.111 | 1.8052 | 25.4 |
| 10 | 2.425 | 0.809 | 1.7725 | 49.6 |
| 11 | −2.702 | 0.008 | | |
| 12 | 2.781 | 0.274 | 1.6700 | 47.2 |
| 13 | 11.994 | Movement 2 | | |
| 14 | 5.712 | 0.373 | 1.6200 | 36.3 |
| 15 | −2.253 | 0.078 | 1.8040 | 46.6 |
| 16 | 3.101 | Movement 3 | | |

TABLE 6-continued

F = 1.00~1.10~1.33 (F: Focus distance)

| Surface Number | R | D | $N_d$ | $v_d$ |
|---|---|---|---|---|
| 17 Variable Diaphragm | ∞ | 0.213 | | |
| 18 | 2.555 | 0.141 | 1.6700 | 47.2 |
| 19 | −6.635 | Movement 4 | | |
| 20 | 1.682 | 0.054 | 1.6477 | 33.8 |
| 21 | 1.196 | 0.268 | | |
| 22 | −0.981 | 0.062 | 1.7174 | 29.5 |
| 23 | 3.474 | 0.346 | 1.4970 | 81.5 |
| 24 | −1.345 | 0.008 | | |
| 25 | 5.938 | 0.364 | 1.4970 | 81.5 |
| 26 | −1.789 | Movement 5 | | |
| 27 | 3.149 | 0.268 | 1.7859 | 44.2 |
| 28 | −13.663 | 0.763 | | |
| 29 | ∞ | 1.215 | 1.5163 | 64.1 |
| 30 | ∞ | 0.116 | 1.4875 | 70.2 |
| 31 | ∞ | | | |

| (Movement Spacing) | Wide | Middle | Tele |
|---|---|---|---|
| Movement 1 | 0.659 | 0.603 | 0.538 |
| Movement 2 | 0.241 | 0.469 | 0.972 |
| Movement 3 | 1.432 | 1.059 | 0.252 |
| Movement 4 | 0.655 | 0.705 | 0.750 |
| Movement 5 | 0.012 | 0.163 | 0.486 |
| Diaphragm Diameter | 0.895 | 0.928 | 0.980 |

According to the projecting zoom lens of the example 6, as shown in Table 8, the conditional expressions (1) to (6) are all satisfied.

Figure 20:
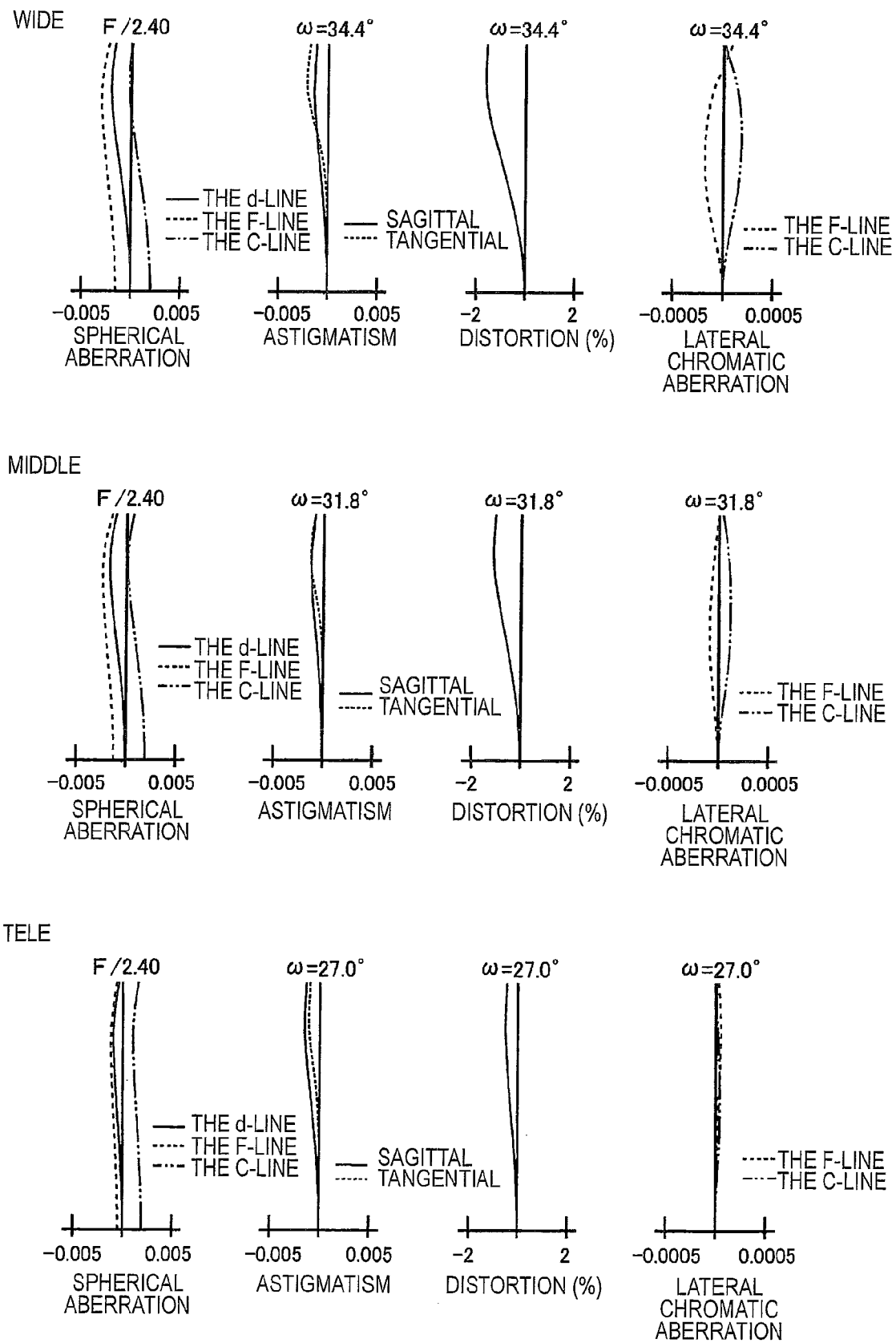
FIG. 20 shows the respective aberrations of the projecting zoom lens according to the example 6 at the wide angle end, middle position and tele end.

Also, FIG. 20 is an aberration view to show the spherical aberrations, astigmatism, distortions and magnification color aberrations of the projecting zoom lens according to the example 6 at the wide angle end, at the middle point and at the tele end.

As may be seen clearly from these aberration views, according to the projecting zoom lens of the example 6, the amount of variations in various aberrations including spherical aberrations and astigmatism caused when zooming the projecting zoom lens may be reduced down to a very small amount and also such various aberrations may be corrected quite properly.

Also, according to the projecting zoom lens of the example 6, the values of the fastness (Fno.) of the zoom lens at the wide angle end, at the middle point and at the tele end are all 2.40, while the amount of variations in the fastness (Fno.) caused when zooming the present zoom lens is substantially 0.

Example 7

Figure 13:
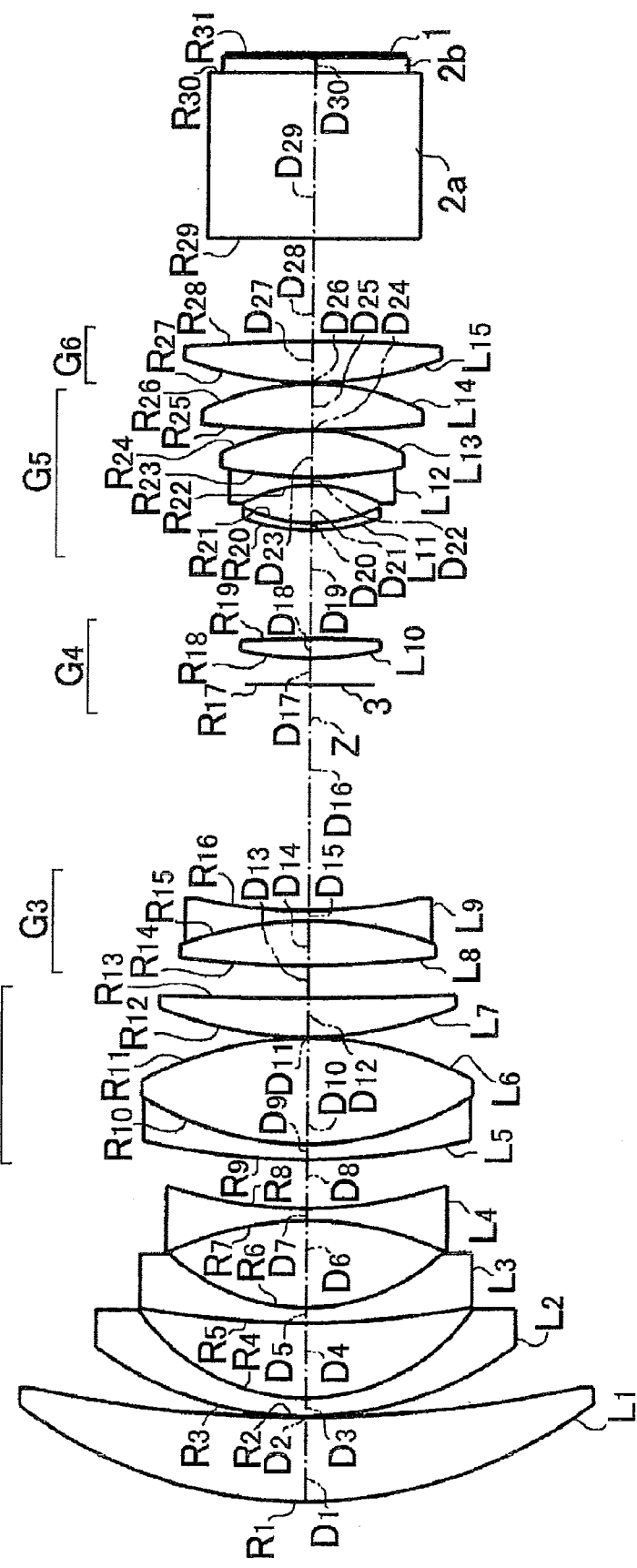
FIG. 13 is a lens structure view of a projecting zoom lens according to an example 7.

FIG. 13 shows a schematic structure of a projecting zoom lens according to an example 7. Basically, this projecting zoom lens, substantially similarly to the example 1, includes six lens groups. Specifically, the respective lens groups are structured in the following manner.

Firstly, the first lens group $G_1$ includes, sequentially from the magnification side, a first lens $L_1$ made of a positive meniscus lens having a convex surface facing the magnification side, a second lens $L_2$ made of a negative meniscus lens having a convex surface facing the magnification side, a third lens $L_3$ made of a negative meniscus lens having a convex surface facing the magnification side, and a fourth lens $L_4$ made of a biconcave lens. And, the second lens group $G_2$ includes, sequentially from the magnification side, a fifth lens $L_5$ made of a negative meniscus lens having a convex surface facing the magnification side, a sixth lens $L_6$ made of a biconvex lens, and a seventh lens $L_7$ made of a positive meniscus lens having a convex surface facing the magnification side, while the fifth lens $L_5$ and sixth lens $L_6$ are connected together to form a cemented lens.

Also, the third lens group $G_3$ includes, sequentially from the magnification side, an eighth lens $L_8$ made of a biconvex lens and a ninth lens $L_9$ made of a biconcave lens, while the eighth and ninth lenses $L_8$ and $L_9$ are connected together to form a cemented lens.

Also, the fourth lens groups $G_4$ includes only a tenth lens $L_{10}$ made of a biconvex lens. And, the fifth lens group $G_5$ includes, sequentially from the magnification side, an eleventh lens $L_{11}$ made of a negative meniscus lens having a convex surface facing the magnification side, a twelfth lens $L_{12}$ made of a biconcave lens, a thirteenth lens $L_{13}$ made of a biconvex lens, and a fourteenth lens $L_{14}$ made of a biconvex lens, while the twelfth lens $L_{12}$ and thirteenth lens $L_{13}$ are connected together to form a cemented lens. Further, the sixth lens group $G_6$ includes only a fifteenth lens $L_{15}$ made of a biconvex lens.

Figure 14:
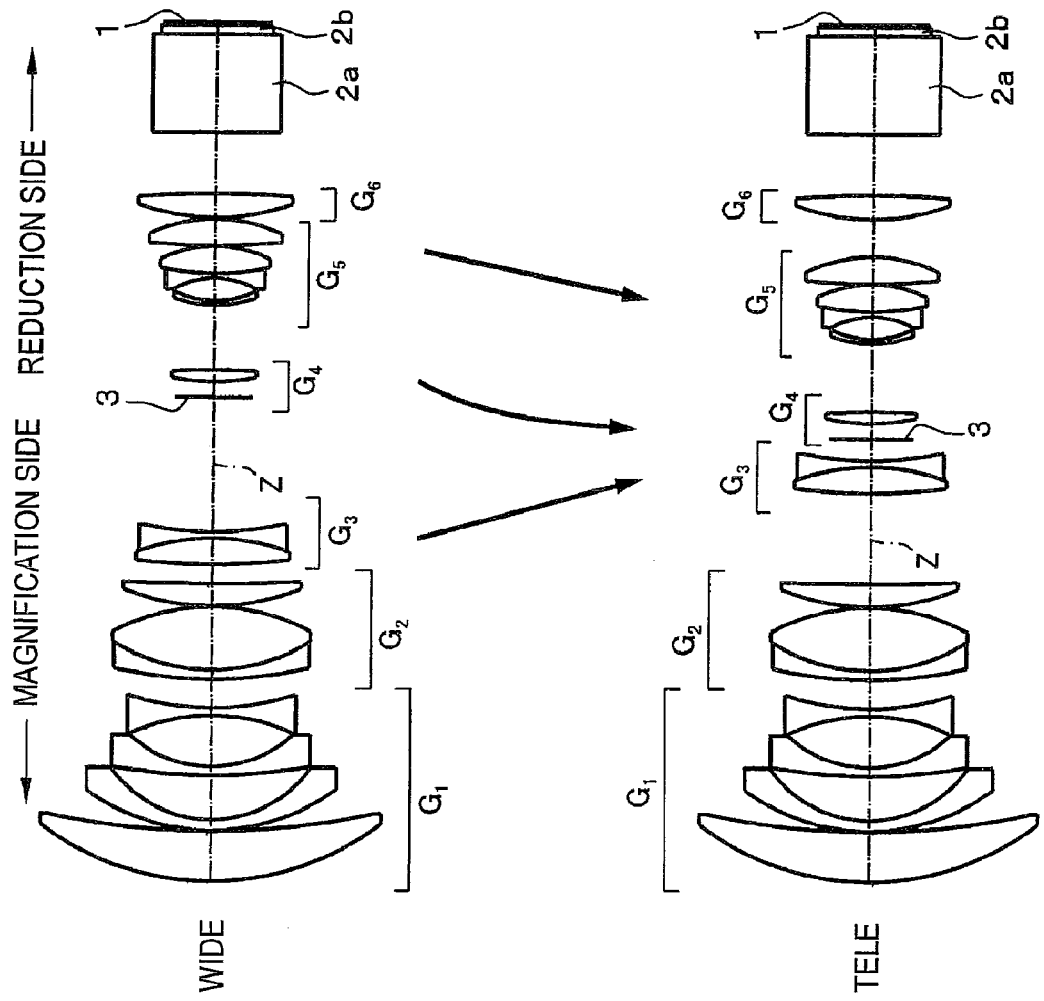
FIG. 14 is a view to show the moving positions of the respective lens groups of the projecting zoom lens according to the example 7 at the wide angle end and tele end thereof.

FIG. 14 shows the moving positions of the respective lens groups of the projecting zoom lens according to the example 7 at the wide angle end, at the middle point and at the tele end. As shown in FIG. 14, in the power varying operation, the first lens group $G_1$, second lens group $G_2$ and sixth lens group $G_6$ are used as fixed lens groups, while the third to fifth lens groups $G_3$ to $G_5$ are used as moving lens groups.

Also, the aperture (variable diaphragm) 3 is disposed in the fourth lens group $G_4$ and is structured such that, in the power varying operation, it is allowed to move integrally with the tenth lens $L_{10}$. Also, the reduction side of the present lens system is formed telecentric.

In Table 7, there are shown the values of the following items: that is, the radius of curvature R of the respective lens surfaces of the present projecting zoom lens; the on-axis surface spacings D of the respective lenses; and, the refractive indexes N and Abbe numbers v on the d line of the respective lenses.

Here, in the lower stage of Table 7, there are shown spacings between the respective lenses at the wide angle end, at the middle point and at the tele end. Also, in the lower stage of Table 7, there are shown the aperture diameters (diaphragm diameters) of the aperture (variable diaphragm) 3 at the wide angle end, at the middle point and at the tele end.

At the wide angle end, the diameter is 0.955, at the middle point, 0.976 and, at the tele end, 1.027, whereby, even in the power varying operation, the fastness (Fno.) is prevented from varying.

TABLE 7

F = 1.00~1.10~1.33 (F: Focus distance)

| Surface Number | R | D | $N_d$ | $v_d$ |
|---|---|---|---|---|
| 1 | 3.450 | 0.616 | 1.8040 | 46.6 |
| 2 | 9.314 | 0.010 | | |
| 3 | 2.580 | 0.132 | 1.7292 | 54.7 |
| 4 | 1.487 | 0.550 | | |
| 5 | 6.811 | 0.108 | 1.8040 | 46.6 |
| 6 | 1.466 | 0.638 | | |
| 7 | −2.353 | 0.089 | 1.7440 | 44.8 |
| 8 | 3.241 | 0.360 | | |
| 9 | 5.388 | 0.110 | 1.8052 | 25.4 |
| 10 | 2.266 | 0.779 | 1.7880 | 47.4 |
| 11 | −2.556 | 0.008 | | |
| 12 | 2.837 | 0.284 | 1.5174 | 52.4 |
| 13 | 25.096 | Movement 1 | | |
| 14 | 7.725 | 0.326 | 1.6398 | 34.5 |
| 15 | −2.661 | 0.077 | 1.8040 | 46.6 |
| 16 | 3.812 | Movement 2 | | |
| 17 Variable Diaphragm | ∞ | 0.193 | | |
| 18 | 2.370 | 0.144 | 1.7440 | 44.8 |
| 19 | −10.107 | Movement 3 | | |

TABLE 7-continued

| F = 1.00~1.10~1.33 (F: Focus distance) | | | | |
|---|---|---|---|---|
| 20 | 1.475 | 0.054 | 1.6727 | 32.1 |
| 21 | 1.144 | 0.276 | | |
| 22 | −1.046 | 0.062 | 1.7283 | 28.5 |
| 23 | 3.209 | 0.340 | 1.4970 | 81.5 |
| 24 | −1.499 | 0.008 | | |
| 25 | 8.852 | 0.335 | 1.4970 | 81.5 |
| 26 | −1.832 | Movement 4 | | |
| 27 | 2.726 | 0.299 | 1.7440 | 44.8 |
| 28 | −12.055 | 0.761 | | |
| 29 | ∞ | 1.212 | 1.5163 | 64.1 |
| 30 | ∞ | 0.116 | 1.4875 | 70.2 |
| 31 | ∞ | | | |

| (Movement Spacing) | Wide | Middle | Tele |
|---|---|---|---|
| Movement 1 | 0.237 | 0.569 | 1.131 |
| Movement 2 | 1.669 | 1.187 | 0.271 |
| Movement 3 | 0.805 | 0.819 | 0.852 |
| Movement 4 | 0.012 | 0.147 | 0.468 |
| Diaphragm Diameter | 0.955 | 0.976 | 1.027 |

According to the projecting zoom lens of the example 7, as shown in Table 8, the conditional expressions (1) to (6) are all satisfied.

Also, FIG. 21 is an aberration view to show the spherical aberrations, astigmatisms, distortions and power chromatic aberrations of the projecting zoom lens according to the example 7 at the wide angle end, at the middle point and at the tele end.

As may be seen clearly from these aberration views, according to the projecting zoom lens of the example 7, the amount of variations in various aberrations including spherical aberrations and astigmatism caused when zooming the projecting zoom lens may be reduced down to a very small amount and also such various aberrations may be corrected quite properly.

Also, according to the projecting zoom lens of the example 7, the values of the fastness (Fno.) of the zoom lens at the wide angle end, at the middle point and at the tele end are all 2.00, while the amount of variations in the fastness (Fno.) caused by the zooming operation of the present zoom lens is substantially 0.

TABLE 8

| | (1) \|M2/M3\| | (2) \|fBw/fw\| | (3) \|fBt − fBw\|/ fw | (4) \|f1/fw\| | (5) N1G | (6) 2ω |
|---|---|---|---|---|---|---|
| Example 1 | 0.233 | 0.158 | 0.354 | 1.225 | 1.766 | 70.2 |
| Example 2 | — | 0.856 | 0.607 | — | — | — |
| Example 3 | — | 0.524 | 0.141 | — | — | — |
| Example 4 | — | 0.150 | 0.050 | — | — | — |
| Example 5 | 0.190 | 0.308 | 0.411 | 1.130 | 1.706 | 75.2 |
| Example 6 | 0.198 | 0.284 | 0.308 | 1.001 | 1.717 | 68.8 |
| Example 7 | 0.000 | 0.269 | 0.328 | 0.957 | 1.770 | 68.6 |

Here, a projecting zoom lens according to the invention is not limited to the projecting zoom lenses used in the above-mentioned examples but it may be changed variously. For example, the radius of curvature R of the respective lenses and the on-axis surface spacing D between the lenses may be changed properly.

Also, a projection type display apparatus according to the invention is not limited to the above-structured apparatus but other various structures each including a projecting zoom lens according to the invention are also possible. As a light valve, for example, there may be used a transmission type or reflection type liquid crystal display element, or a micro mirror device including a large number of inclination changeable micro mirrors formed on a substantially plane surface (for example, a digital micro mirror device manufactured by Texas Instrument Inc.). Also, as an illumination optical system, there may be employed a structure which properly corresponds to the kinds of light valves.

What is claimed is:

1. A projecting zoom lens, comprising sequentially from the magnification side thereof:
   a first lens group having a negative refractive power;
   a second lens group having a positive refractive power;
   a third lens group having a negative refractive power;
   a fourth lens group having a positive refractive power;
   a fifth lens group having a positive or negative refractive power; and,
   a sixth lens group having a positive refractive power,
   wherein a reduction side of the zoom lens is formed as a telecentric system,
   each distance between respective lenses of the second and sixth lens groups varies in a zooming,
   the third lens group moves along an optical axis from a magnification side to the reduction side as the zoom lens goes from a wide angle end toward a tele end in the zooming, and
   a following conditional expression (1) is satisfied, that is, $$|M2/M3|<1.0 \quad (1),$$

where Mi: a movement of the zooming of a i-th lens group along the optical axis from the wide angle end to the tele end of the zooming lens.

2. The projecting zoom lens according to claim 1, wherein a variable diaphragm is interposed between the third and fourth lens groups, and
   a diaphragm diameter of the variable diaphragm is varied so as to be constant in a light amount of the light beam to pass through the variable diaphragm in the whole area of the zooming.

3. The projecting zoom lens according to claim 1, wherein the following conditional expression (2) is satisfied: that is, $$|fBw/fw|<1.5 \quad (2),$$

where fBw: a distance at the wide angle end, of all lens surfaces situated on the reduction side from variable diaphragm, from the surface top position of the lens surface that is situated at a deepest position on the magnification side to a magnification side focal point position and,
   fw: a focal distance of a whole lens system at the wide angle end of the zooming lens.

4. The projecting zoom lens according to claim 1, wherein the following conditional expression (3) is satisfied: that is, $$|fBt-fBw|/fw<1.2 \quad (3),$$

where fBt: a distance at the tele end, of all lens surfaces situated on the reduction side from variable diaphragm, from a surface top position of the lens surface that is situated at a deepest position on the magnification side to a magnification side focal point position,
   fBw: a distance at the wide angle end, of all lens surfaces situated on the reduction side from variable diaphragm, from the surface top position of the lens surface that is situated at the deepest position on the magnification side to the magnification side focal point position, and
   fw: a focal distance of a whole lens system at the wide angle end of the zooming lens.

5. The projecting zoom lens according to claim 1, wherein a lens group disposed at a deepest position on the magnification side has a negative refractive power which is fixed in the zooming and has a focusing function and, a lens group disposed at a deepest position on the reduction side has a positive refractive power and is fixed in the zooming.

6. The projecting zoom lens according to claim 1, wherein a following conditional expression (4) is satisfied: that is, $$0.6<|f1/fw|<1.5 \qquad (4),$$

where f1: a focal distance of the first lens group, and fw: a focal distance of a whole lens system at the wide angle end.

7. The projecting zoom lens according to claim 1, wherein the first lens group is moved along the optical axis to thereby adjust a focusing of the zoom lens.

8. The projecting zoom lens according to claim 1, wherein a following conditional expression (5) is satisfied: that is, $$1.7<N_{1G} \qquad (5),$$

where $N_{1G}$: an average value of refractive indexes of respective lenses of the first lens group.

9. The projecting zoom lens according to claim 1, wherein the third lens group is a cemented lens cemented together a biconvex lens and a biconcave lens which are arranged sequentially in an order from the magnification side of the zoom lens.

10. The projecting zoom lens according to claim 1, wherein a following conditional expression (6) is satisfied: that is, $$2\omega>60° \qquad (6),$$

where 2ω: the whole angle of view at the wide angle end of the zoom lens.

11. A projection type display apparatus, comprising:
a light source;
a light valve;
an illuminating optical portion which guides a light beam from the light source onto the light valve; and,
a projecting zoom lens according to claim 1 and having a reduction side formed as telecentric,
wherein the light beam from the light source is light modulated by the light valve and the modulated light beam is projected onto a screen by the projecting zoom lens.

* * * * *